(12) United States Patent
Lakshminarayanan et al.

(10) Patent No.: US 12,348,536 B1
(45) Date of Patent: Jul. 1, 2025

(54) CLOUD INTEGRATED NETWORK SECURITY

(71) Applicant: Rapid7, Inc., Boston, MA (US)

(72) Inventors: Sai Krishna Lakshminarayanan, Galway (IE); Gianni Tedesco, Seoul (KR); Morgan Nally, Galway (IE); Luke Coughlan, Galway (IE)

(73) Assignee: Rapid7, Inc., Boston, MA (US)

( * ) Notice: Subject to any disclaimer, the term of this patent is extended or adjusted under 35 U.S.C. 154(b) by 216 days.

(21) Appl. No.: 18/203,256

(22) Filed: May 30, 2023

(51) Int. Cl.
*H04L 29/00* (2006.01)
*H04L 9/40* (2022.01)

(52) U.S. Cl.
CPC ...... *H04L 63/1416* (2013.01); *H04L 63/1466* (2013.01)

(58) Field of Classification Search
CPC .................. H04L 63/1416; H04L 63/1466
See application file for complete search history.

(56) References Cited

U.S. PATENT DOCUMENTS

| | | | |
|---|---|---|---|
| 7,788,722 B1* | 8/2010 | Njemanze | H04L 63/1408 726/22 |
| 8,462,781 B2 | 6/2013 | McGhee et al. | |
| 9,178,902 B1* | 11/2015 | Zagorsky | H04L 63/1416 |
| 9,654,510 B1* | 5/2017 | Pillai | H04L 63/20 |
| 9,697,355 B1* | 7/2017 | Park | G06F 21/554 |
| 10,091,075 B2 | 10/2018 | Hegde et al. | |
| 10,205,733 B1* | 2/2019 | Park | H04L 63/18 |
| 10,778,610 B2 | 9/2020 | Levy et al. | |
| 10,795,578 B2 | 10/2020 | Floyd et al. | |
| 10,803,201 B1* | 10/2020 | Nicholls | G06F 21/6227 |
| 10,868,825 B1* | 12/2020 | Dominessy | H04L 43/045 |
| 11,184,403 B1* | 11/2021 | Wu | H04L 67/10 |
| 11,336,698 B1* | 5/2022 | Wu | G06F 21/54 |
| 11,379,607 B2 | 7/2022 | Swafford | |
| 11,444,871 B1* | 9/2022 | Nainar | H04L 63/0272 |
| 11,457,024 B2* | 9/2022 | Bindal | G06Q 10/0635 |
| 11,575,712 B2 | 2/2023 | Kung et al. | |
| 11,694,775 B1* | 7/2023 | Maier | G06N 5/045 705/2 |
| 11,818,101 B2* | 11/2023 | Santuka | H04L 63/0876 |
| 2007/0226807 A1* | 9/2007 | Ginter | H04N 21/2541 713/168 |
| 2013/0312101 A1* | 11/2013 | Lotem | G06F 21/55 726/25 |

(Continued)

*Primary Examiner* — Don G Zhao
(74) *Attorney, Agent, or Firm* — Ashwin Anand; Lei Sun

(57) ABSTRACT

Various embodiments include systems and methods pertaining to a security service platform that detects security threats based on a security service that operates on structurally deduplicated network data. The security service may operate within a cloud environment and perform the security analysis that includes compiling a ruleset to generate an executable, where the executable is run over the structurally deduplicated event data. If the executable identifies a rule match for a given portion of structurally deduplicated event data, then the security service platform may reconstruct the structurally deduplicated event data to access all portions of a network event associated with the structurally deduplicated event data that triggered the rule match. The security service platform may use the reconstructed event data to generate and provide an alert that indicates a detected cyberattack.

20 Claims, 22 Drawing Sheets

(56) References Cited

U.S. PATENT DOCUMENTS

| | | | |
|---|---|---|---|
| 2014/0046645 A1* | 2/2014 | White | H04L 63/1433 |
| | | | 703/13 |
| 2017/0098087 A1* | 4/2017 | Li | H04L 63/1416 |
| 2017/0099311 A1* | 4/2017 | Kesin | H04L 67/535 |
| 2017/0124351 A1* | 5/2017 | Scaiano | H04L 63/0421 |
| 2017/0195354 A1* | 7/2017 | Kesin | H04L 67/535 |
| 2017/0214702 A1* | 7/2017 | Moscovici | H04W 12/106 |
| 2017/0324768 A1* | 11/2017 | Crabtree | H04L 63/1433 |
| 2018/0013771 A1* | 1/2018 | Crabtree | H04L 63/1416 |
| 2018/0234435 A1* | 8/2018 | Cohen | H04L 63/1416 |
| 2018/0295154 A1* | 10/2018 | Crabtree | H04L 63/1433 |
| 2019/0007441 A1* | 1/2019 | Kesin | H04L 63/083 |
| 2020/0045064 A1* | 2/2020 | Bindal | G06N 20/00 |
| 2021/0105294 A1* | 4/2021 | Kruse | H04L 63/145 |
| 2021/0112083 A1* | 4/2021 | Janakiraman | H04L 63/1416 |
| 2021/0293130 A1* | 9/2021 | Revheim | E21B 44/00 |
| 2021/0320941 A1* | 10/2021 | e Silva | H04L 63/1433 |
| 2022/0078209 A1* | 3/2022 | V | H04L 63/105 |
| 2022/0103594 A1* | 3/2022 | Galloway | H04L 63/205 |
| 2022/0103597 A1* | 3/2022 | Gobena | H04L 63/205 |
| 2022/0108402 A1* | 4/2022 | Jalal | G06Q 40/06 |
| 2022/0188733 A1* | 6/2022 | Wang | G06Q 10/10 |
| 2023/0114774 A1* | 4/2023 | Santuka | H04L 63/107 |
| 2023/0230126 A1* | 7/2023 | Habibabadi | G06Q 30/0255 |
| | | | 705/14.53 |
| 2024/0070287 A1* | 2/2024 | Cooney | G06F 16/958 |
| 2024/0095358 A1* | 3/2024 | Zhang | G06F 21/554 |
| 2024/0143737 A1* | 5/2024 | Zamir | G06F 21/53 |

\* cited by examiner

Alert tls $EXTERNAL_NET any -> $HOME_NET any (
msg:"ET MALWARE SSL/TLS Certificate Observed (StrongPity)";
flow:established,to_client;
sid:2027718;
rev:3;
tls.cert_subject;
content:"CN=debian";
nocase;
endswith;
tls.cert_issuer;
content:"CN=debian";
nocase;
endswith;
tls.cert_serial;
content:"00:B5:72:87:4F:73:1F:AC";
classtype:"trojan-activity";

FIG. 8

CLOUD INTEGRATED NETWORK SECURITY

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

BRIEF DESCRIPTION OF THE DRAWINGS

FIG. 8 is a depiction of an example rule associated with a network security threat, in accordance with some embodiments.

Figure 1:
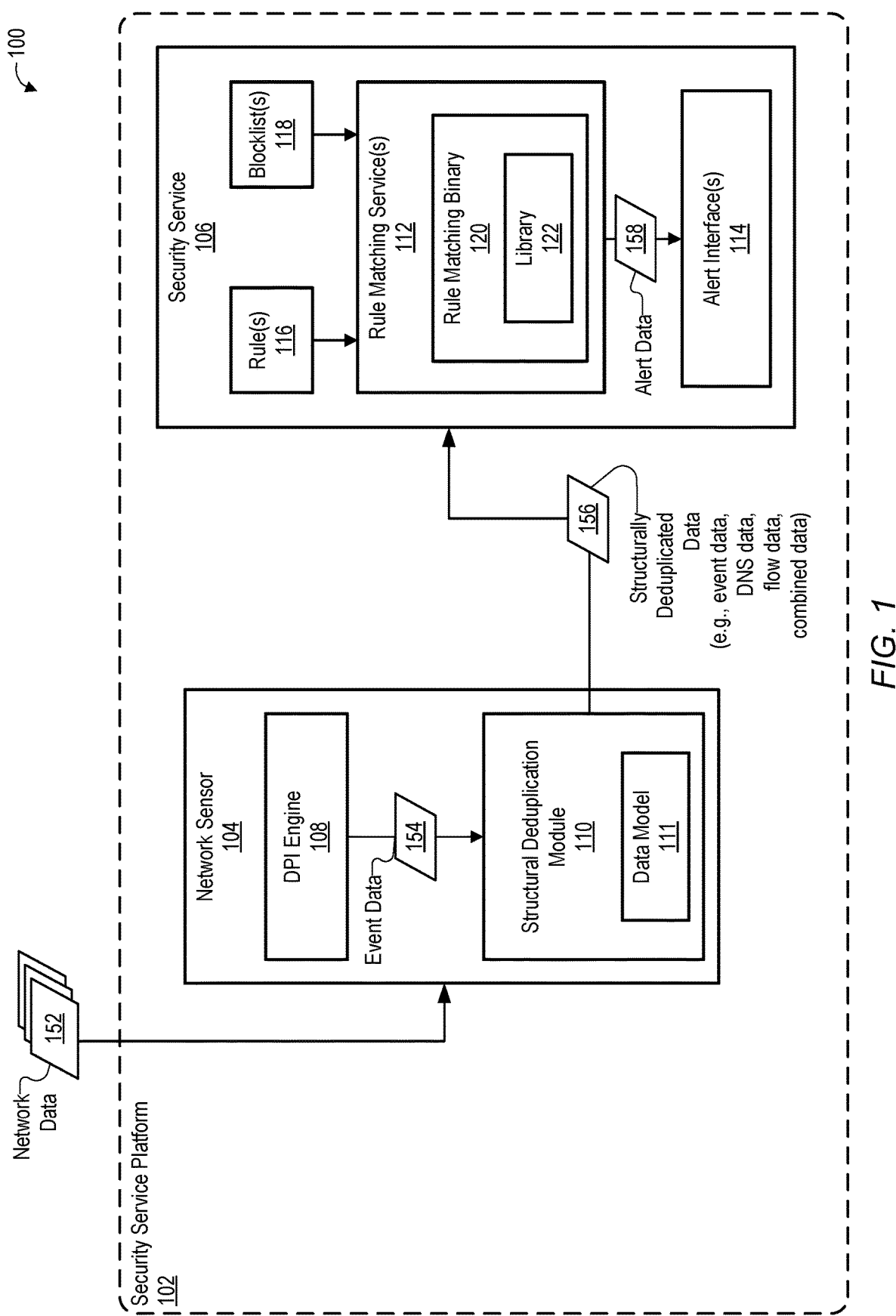
FIG. 1 is a block diagram illustrating an example security service platform that includes a network sensor and a security service, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security service platform analyzes network data to detect threats to a computer network or computer system. As part of detecting threats, the security service platform may determine event data based on network data, deduplicate event data based on a structure of a data model ("structurally deduplicated") for organizing the event data, and run a security analysis on the structurally deduplicated event data.

As described in greater detail herein, based on the security service platform using the structure of data being deduplicated, the structurally deduplicated event data is more compact than traditionally compressed data or traditionally deduplicated data. As a result, one technical advantage of the structurally deduplicated data is that the security service platform may perform a security analysis that is orders of magnitude faster as compared to traditional approaches that operate on compressed data, traditionally deduplicated data, or raw data.

Based on the improved performance, another technical advantage is that the security service platform may use a larger ruleset to increase coverage of threat detection. Additional performance improvements based on the security service platform structurally deduplicated event data according to a structure of a data model of the event data is that the security service platform may use a single instance of structurally deduplicated event data to represent multiple network events.

In this way, using the structurally deduplicated data, the security service platform may detect multiple cyberthreats based on a single instance of structurally deduplicated data being indicative of a cyberattack. The security service platform may structurally deduplicate event data without loss of any original information.

In some implementations, if the security service platform detects a threat, the security service platform may reconstruct the full details of a given event based on the structurally deduplicated event data. The security service platform may use the reconstructed event to generate an alert that includes a detailed account of a threat. In cases where there is no threat detected, the security service platform may continue analyzing additional network data without performing a reconstruction of a network event. By contrast, traditional approaches that compress data prior to analysis first decompress the entire dataset to access data for the analysis.

In some implementations, the security service platform may perform a security analysis that includes rule matching to detect threats to a network. Based on the improved performance of matching on rule using structurally deduplicated event data, the security service platform enables improvements in efficiency with respect to the extent of rule coverage involved in matching security rules against network events. In other examples, the security service platform may use one or more trained machine learning models operating on the structurally deduplicated event data to detect a threat to a network or computer system.

The security service platform may be implemented on various types of system architectures. As one example, a local network may implement a network data sensor, detect network events, and structurally deduplicate event data, where a remote network may perform a security analysis on the structurally deduplicated event data. In this example, the local network may be a client network that provides one or more services to clients. Further in this example, the remote network may be a cloud compute environment, a data center, or a different client network.

In various embodiments, the security service platform may include a network sensor host and one or more cloud services. The security service platform may be implemented, at least in part, by the network sensor host and/or by the cloud service(s). As used herein, a network sensor host refers to a computing device that hosts a network sensor.

In traditional systems, increasing rule coverage for network detections may increase the amount of processing required for each packet that passes through a security analysis component. In such a traditional system, this can reduce overall throughput performance as increasing cycles per packet may decrease maximum packet throughput leading to a balancing act where new rules and detections would not be added when they would significantly hinder performance.

By contrast, the rule matching disclosed herein may allow for processing and rule matching of an expanded ruleset over structurally deduplicated event data, where the security service platform may perform rule matching in the cloud to reduce the load on an on-premises network sensor, and may increase the overall capacity of a ruleset without impacting network sensor performance.

In traditional systems, remote processing of network data may come with the challenge of moving the network data to the cloud. Storage and network bandwidth requirements to handle network data as-is may make a solution that involves moving the network data to the cloud nonviable. The viability of transmitting network data is not much improved by using traditional compression or deduplication at least in part because, in stark contrast to the disclosed techniques, traditional compression or deduplication methods are agnostic to the structure by which the uncompressed data is organized or structured.

In some implementations, the security service platform may include a sensor that receives or accesses network data and determines network events, such as access attempts on one or more network or system resources. The network events may include data used in rule matching. The sensor may be implemented on a client network, and the event data may be structurally deduplicated prior to sending to a cloud service. In some examples, the structurally deduplicated data may be compressed for additional reduction in bandwidth used for transmitting event data to a cloud service that is part of the security service platform.

Continuing this example, the cloud service may perform a security analysis that includes compiling a ruleset to generate an executable, where the executable is run over the structurally deduplicated event data. If the executable identifies a rule match for a given portion of structurally deduplicated event data, then the security service platform may reconstruct the structurally deduplicated event data to access all portions of a network event associated with the structurally deduplicated event data that triggered the rule match. The security service platform may use the reconstructed event data to generate and provide an alert that indicates a detected cyberattack.

In some implementations, the security service platform may be configured to parse rules, analyze rules, and/or compile rulesets. The compiled rulesets may produce an executable binary file ("executable"). The security service platform may use techniques from compiler theory to include optimizations and new applications of rulesets, as well as additional static analysis for helping rule authors quickly catch bugs in their rules. An executable binary file (e.g., a C binary) generated by the security service platform may be used to run against each of the compressed files to perform rule matching. The compressed files may include structurally deduplicated data, which may be iterated over and checked against the compiled rules in the executable binary file.

In some implementations, bitmaps may be used to record indexes within structurally deduplicated data for any clients or servers which trigger a match. In the case of no matches, the structurally deduplicated data is not examined any further. By contrast, if there are matches, an events table included in the compressed file may be examined. If the events table is compressed, it may be decompressed and then iterated over. Table indexes from each event may be checked against the bitmaps and only in cases of a match is the corresponding event fully reconstructed and the relevant alert(s) generated.

In some implementations, for on-premises elements of the security service platform, a network sensor may receive network data and determine network events containing relevant data for later rule matching. On the network sensor, these events and relevant data may be represented as event data. Event data may be compressed and structurally deduplicated via a structural deduplication module to generate structurally deduplicated data. Structurally deduplicated data may then be transmitted to a cloud service. In the cloud, the security service platform may receive the structurally deduplicated data and run the structurally deduplicated data through a compiled ruleset. Alerts may be generated for any matches. The security service platform may also be responsible for updating and recompiling the ruleset as needed.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to obscure the disclosed embodiments.

Referring to FIG. 1, an example computing environment 100 illustrates various components of a security service platform 102, in accordance with some embodiments.

In some implementations, the security service platform 102 operations include at least: event data collection and security analysis. In some examples, the security service platform 102 may be implemented on a client network, a data center, a cloud compute environment, among other computing environments. In this example, security service platform 102 may implement event collection using a network sensor 104 operating on a client network. The security service platform 102 may implement security analysis using a security service 106 operating in a cloud compute environment.

In some implementations, the network sensor 104 may include a deep packet inspection (DPI) engine 108 and a structural deduplication module 110. The DPI engine 108 may scan network data 152 to determine network events and generate event data 154. The structural deduplication module 110 may structurally deduplicate event data 154 according to a structure for a data model 111 for organizing the event data 154. For example, event data 154 may be structured according to a data model 111 that specifies one or more fields of data, types of fields, and/or data types, where one or more of the fields may be nested.

The structural deduplication module 110 may determine structurally deduplicated data 156 based on event data 154. In some examples, the structurally deduplicated data 156 may be compressed prior to transmission, or prior to being accessed, by the security service 106.

The security service 106 may include a rule matching service 112 and an alert interface 114. In some examples, the security service 106 may periodically receive structurally deduplicated data 156 from the network sensor 104. In other examples, the security service 106 may initiate a query to determine whether structurally deduplicated data 156 is available. In other examples, the security service platform 102 may use a storage service for communicating structurally deduplicated data 156 from the network sensor 104 to the security service 106. As one example, the security service platform 102 may use a cloud storage service that may include notification protocols, such as Amazon Web Services (AWS) S3 buckets.

The rule matching service 112 may perform a security analysis on the structurally deduplicated data 156. For example, the rule matching service 112 may, based on one or more rules 116 and/or blocklists 118, determine that one or more network events in the structurally deduplicated data 156 are indicative of a cyberattack. While the rule matching service 112 may operate on the structurally deduplicated data 156, in some examples, the structurally deduplicated data 156 may be compressed.

The rule matching service 112 may access one or more rules 116 or rulesets, and/or one or more blocklists 118. The security service 106 may compile rules 116 and/or blocklists 118 to generate an executable file, such as a rule matching binary 120. The rule matching binary 120 may use one or more libraries 122 that may be used to match against structurally deduplicated event data or both structurally deduplicated and compressed event data.

In some implementations, if the structurally deduplicated data 156 is compressed, then the security service 106 may decompress the structurally deduplicated data 156 prior to performing rule matching based on the rules 116 or blocklists 118. As described above, while the structurally deduplicated data 156 may be compressed or decompressed, the security service 106 may perform a security analysis on the structurally deduplicated event data without reconstructing the event data to an original form associated with a state prior to structural deduplication.

In some implementations, if the rule matching service 112 determines that a given instance of event data, as structurally deduplicated and organized according to a format of the structurally deduplicated event data, is indicative of a cyberattack, the security service 106 may reconstruct some or all of the instance of event data.

The alert interface 114 may be used by the security service 106 to generate alerts and/or initiate other remediation actions. For example, a client service being monitored by the security service platform 102 may provide a user interface, such as a dashboard, user interface element, or other indication of security status. In this example, the alert interface 114 may communicate alert data to the client service.

The alert data may include one or more portions of the event data associated with a cyberattack, or potential cyberattack. The alert data may also include information related to a user profile associated with the event data, geographic information of a user, network asset target, attempted activities, among other information associated with a security threat.

Given the above overview in the context of FIG. 1, additional features and examples are now described.

As depicted in FIG. 1, the security service platform 102 may include a structural deduplication module 110. The structural deduplication module 110 may receive network event data 154 generated by the DPI engine 108 and deduplicate structures within the event data 154 that are known to be highly repeated.

Continuing this example, the structural deduplication module 110 may store each unique structure into one of a set of tables, where there is a table for each type of data structure. In this example, the structural deduplication not only reduces the file size, which reduces storage costs, but structural deduplication also enables more efficiency in matching rules. In this example, the efficiency in rule matching may be because it allows matching against the deduplication tables directly rather than decompressing/reconstructing an entire stream of events. In this way, in the majority of cases (i.e., when no rules match), the security service platform 102 does not evaluate the actual list of events.

In some implementations, the security service 106 may include a Suricata rule parser, analyzer, and compiler. The security service 106 may use techniques from compiler theory to open up sophisticated optimizations and new applications of rulesets such as ETOpen, as well as additional static analysis for helping rule-authors quickly catch bugs in their rules. In some examples, the compiled binary in the security service 106 may be used to run against each of the structurally deduplicated files to perform rule matching.

In some implementations, the deduplication tables from the structurally deduplicated data 156 payloads may be iterated over and checked against the compiled rules in the binary. In some examples, bitmaps may be used to record table indexes for any clients or servers which trigger a match. In the case of no matches, the structurally deduplicated data 156 may not be examined any further.

However, continuing this example, if there are matches, then the events table may be examined. In this example, if the structurally deduplicated data 156 is compressed, then the structurally deduplicated data 156 may be decompressed and then iterated over. In this example, table indexes from each event may be compared to the bitmaps and in cases of a match, the event data may be fully reconstructed, and a relevant alert may be generated.

In some implementations, the structurally deduplicated data 156 may be sent periodically from the network sensor 104 to an Amazon S3 bucket. For example, the structurally deduplicated data 156 may be sent to a sensor-payloads-{region}buckets. In this example, an S3 bucket notification may be created to filter for this suffix and then send the notification to the Amazon Simple Query Service (SQS). In this example, an SQS may be read by the security service 106. As one example, the security service 106 may be implemented as service in a Docker™ container running within a computing environment, such as an Amazon Elastic Kubernetes Service (EKS).

In some implementations, in parallel to receiving the structurally deduplicated data 156, a scheduled process, such as a cron job, may be run once or more daily. In this example, the scheduled process may update a rules file, such as rules 116, and abuse.ch blocklist CSVs to the sensor-ids-rules bucket. In some examples, a Jenkins job may be run daily after this to check for a new updated rule file/CSV. If present, this Jenkins job may trigger a rebuilding of the security service 106. Such a build of the security service 105 may include generating an executable of the security service 106 and managing all the package requirements for the security service 106 to function properly.

In some implementations, the security service 106 may fetch, or retrieve, an SQS message for an uploaded structurally deduplicated data 156. The security service 106 may then perform the rule matching against the structurally deduplicated data 156. In some examples, if an alert is present, the security service 106 may convert an alert into a Suricata alert format and then uploads the structurally deduplicated data 156 into an S3 bucket sensor-ids-payloads-{region}. In some examples, an S3 bucket notification may be created for the alerts uploaded above.

In some implementations, alert data 158 may be sent to an SNS endpoint. An SQS may be subscribed to this SNS, which may be used to read the alert data 158. The alert data 158 may then be converted into a suitable format and uploaded to a security interface.

In some implementations, the structural deduplication module 110 may receive input that includes a stream of event data 154, such as transport layer security (TLS) data. In some examples, the event data may include: (a) a timestamp and flow 4-tuple (IPs, ports), and (b) fields specific to their data type.

In some implementations, while many of the event fields may have a large range of possible values in theory, such as every possible IP address, in practice in any given network only a small subset of these possible values may ever be seen. Such a practical subset of possible values allows for efficient structural deduplication. In other words, deduplication magnitude may be based at least on the characteristic that in a network the same data may repeatedly appear in network events.

As one example, event data, such as TLS data, for every connection made by a client it may give an identical "Client Hello", and as a result, any TLS events related to that client will share that data. In some examples, the same sharing of data may occur with servers and certificates. Similar redundancy may occur with underlying data structures as well, particularly strings such as those that make up TLS certificates, which may be repeated from one to the next. For example, issuer domain name (DN).

In some examples, instead of storing these strings directly in each event data instance, the structural deduplication module 110 may store all strings uniquely in a single table and have an instance of event data include an index to the table. Continuing this example, a similar process may be performed recursively on more complex structures, such as for TLS data clients, servers and certificates. In some examples, each structure type may include its own uniquely populated table.

In some implementations, as event data 154 arrives at the structural deduplication module 110, the key fields for each key structure are grouped recursively as defined by the schema of the data type for the event data 154. These structures may then be checked against an associated table, starting at the lowest level recursively, if the structure is "new" it is added to the table and the new index returned, or if the structure already exists in the table, then an existing index is returned, ensuring entries in the table remain unique.

In this example, after deduplication, the event data 154, now with table indexes in place of their original data substructures, are added to the events tables in time order. This table may be the largest as the table includes an entry for each individual event with whatever per event data that was not viable for deduplication. Some examples of data that is not viable for deduplication may include timestamps and randomized values like source port, along with indexes for each deduplication table.

In some implementations, the security service platform 102 may take Suricata rules and process them into an efficient binary program. This transformation may take place in a number of stages. In this example, a Suricata rule may be a signature associated with one or more network threats, where Suricata is an open-source intrusion detection system (IDS).

In some implementations, compilation may be defined as a set of algebraic transformations. As a first example, input may be tokenized (rule head, rule options), where rule head includes action to take if rule is triggered (e.g., generate alert, drop traffic, etc.), where the type/protocol of traffic the rule applies to, and traffic direction the rules is concerned with, either source to destination or bidirectional.

In some examples, additional transformations may include: rule options refer to the various keywords and values that make up conditions checked by the rule, e.g., content, nocase, startswith, etc.; options and modifiers may be grouped together, where some options may act as modifiers for others, e.g., nocase modifies content to search for string matches regardless of letter casing, and where these modifiers may be folded into the option search strings to create regexes which can be more efficiently matched against; rules may be converted into an IR which captures the rule semantics; rules may be partitioned into rulesets for each hook-point and each ruleset may then transformed into a backend-independent RTL; RTL may be translated into "machine code" (in our case, a C program via jinja2 templates), which may result in a binary which may be used for rule matching.

In some implementations, the abuse.ch blocklists may also be compiled into a binary at this stage as sorted lists suitable for binary searches. In some examples, a rule matching binary may include a number of optimizations to make it more efficient. For example, a rule matching binary may include a library for reading structurally deduplicated data 156, where given the ability to read structurally deduplicated data 156, rule matching may be performed without reconstructing the original event data 154.

Continuing this example, rule matching without reconstructing the original event data 154 may be performed based on matching rules against one or more entries in the deduplication tables in the structurally deduplicated data 156. Rule matching against the structurally deduplicated data significantly improves rule matching efficiency as each data substructure relevant to the rules is checked uniquely rather than for each event.

In some implementations, for structures that are matched against via binary search of the compiled blocklists, an additional optimization may be carried out. For example, during generation of the structurally deduplicated data 156, these tables may be sorted. Therefore, as these tables are iterated over and their values used in binary searches against blocklists, the portion of the blocklist that needs to be searched is reduced on each iteration as no match can possibly occur on the portion of the list less than the previously searched for value. As a result, an effect is that the search becomes more efficient over the course of table iteration.

In some implementations, bitmaps may be used to record table indexes for any entries which trigger a match. In this example, in the case of no matches, the structurally deduplicated data 156 is not examined any further. In some examples, if the event table has been additionally compressed, for example, by Zstandard, the expensive decompression operation is only carried out if rule matches have occurred.

In some examples, if rule matches have been found, the event table if compressed is decompressed, then deduplication indexes from each event are checked against the bitmaps and only in cases of a match the event is fully reconstructed, and the relevant alert(s) generated. Consequently, even if the rule matches occur, only the few events with matches are decompressed, which results in computational resources being reduced.

Additional features are now described with respect to the network sensor 104 and the structural deduplication module 110. In some implementations, raw network events, such as TLS events, may include redundant data/overhead that makes the network events costly to store and process. Generally, there may be a large quantity of network events, where many of the details are deduplicated. Over time in a network, some patterns may emerge. For example, the same set of clients may repeatedly make connections with the same set of servers. In this example, each of these interactions may result in a network event that includes the full details for the client and server, the certificates involved and so on.

In some implementations, performance improvement based on use of rule matching over structurally deduplicated data 156 may be thousands of times faster as compared to a standard compression of a JSON format used to represent event data. Further, without structurally data deduplicated event data, use of a rule engine once for each event would result in many redundant/identical operations due to the aforementioned repetition of client/server details.

As described herein, the security service platform 102, based on structurally deduplicated data, reduces redundancy, uses more efficient encodings, and generates resultant data that is tailored for a rule-matching engine. Some implementations include some or all of: (a) reducing data representation overhead by using a custom file format which may not be self-describing; (b) reducing data representation overhead based on using efficient binary encodings rather than text-encoding binary fields (e.g., IP addresses, serial number, ja3 hash, fingerprint hash); (c) reducing redundancy based on identifying common structures of network events (client servers, certificates, etc.) and storing non-redundant data in deduplication tables, wherein in this example, network events now reference the tables in the file these key data structures are stored in rather than containing their own individual copy; and (d) leveraging the modern/fast zstd compression library by compressing a list of events, which may be the largest data structure in the resulting new file format.

In some implementations, structural data deduplication, in addition to reducing file size and storage costs, also allows more efficient rule matching. In some examples, efficient rule matching may be based on matching against deduplication tables directly rather than decompressing/reconstructing the whole stream of network events. For example, running TLS rules for each unique client and server seen, rather than every instance of each client or server. Consequently, in many cases (i.e., when no rules match), the original, entire contents of a list of events is not reconstructed or referenced.

In some implementations, structurally deduplicated data may be 25% the size of gzipped JSON, or 3% the size of the raw JSON. In some examples, larger inputs compress better, e.g., closer to 10%/1%. As a result, in some cases, matching the ET-malware ruleset and abuse.ch ja3 and certificate blocklists on a large structurally deduplicated event dataset (e.g., one day of traffic) may be about two thousand (2000 times faster than decompressing the equivalent JSON and parsing it with simdjson.

In some implementations, event data 154, such as a stream of TLS events, may include: a timestamp and flow 4-tuple (IPs, ports), also, start protocol (flow may have started as HTTP or SMTP and then upgraded to TLS); Client Hello, including JA3 and SNI strings; Server Hello, including JA3S and certificate; a certificate that may include mostly strings and then two timestamps for cert valid period; strings for issuer DN, subject CN, cert serial number, and key fingerprint.

Figure 2A:
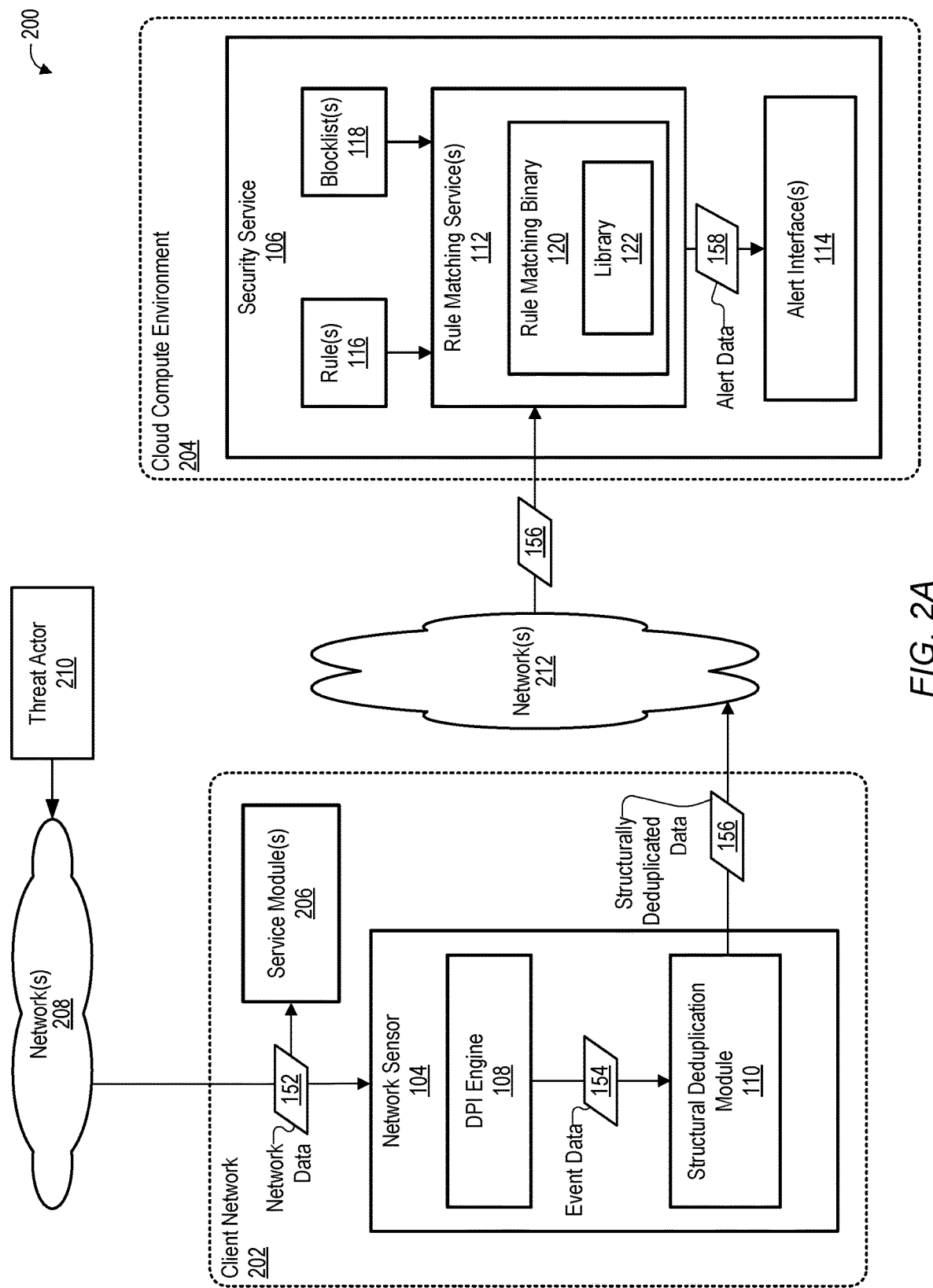
FIG. 2A is a block diagram illustrating an example system architecture for the security service platform, in accordance with some embodiments.

FIG. 2A is a block diagram illustrating an example computing environment 200 that may include a client network and cloud compute environment, in accordance with some embodiments.

As depicted in FIG. 2A, a security service platform 102 may be implemented among a client network 202 and a cloud compute environment 204. In this example, the network sensor 104 may be implemented within the client network 202. The network sensor 104 may be implemented as described with respect to FIG. 1. In this example, the security service 106 may be implemented within the cloud compute environment 204. The security service 106 may be implemented as described with respect to FIG. 1.

In this implementation, the client network 202 may provide one or more services to one or more clients or users. The one or more services may be implemented by one or more service modules 206. Users may access the one or more services over a network, such as network 208, where the network 208 may be a local network, a regional network, or a global network, such as the internet. Among the users, there may be one or more threat actors 210. A threat actor 210 may be an AI (artificial intelligence), a bot, or some other platform used to conduct cyberattacks.

In this example, the client network 202 may communicate with the cloud compute environment 204 over a network 212. In this example, the network sensor 104 may periodically, or in response to one or more instances of event data 154, provide or transmit structurally deduplicated data 156 to the security service 106. In response to receiving, or having access to, the structurally deduplicated data 156, the security service 106 may, based on the rule matching service 112, determine that the structurally deduplicated data 156 is indicative of a cyberattack, as described in greater detail with respect to FIG. 1.

Figure 2B:
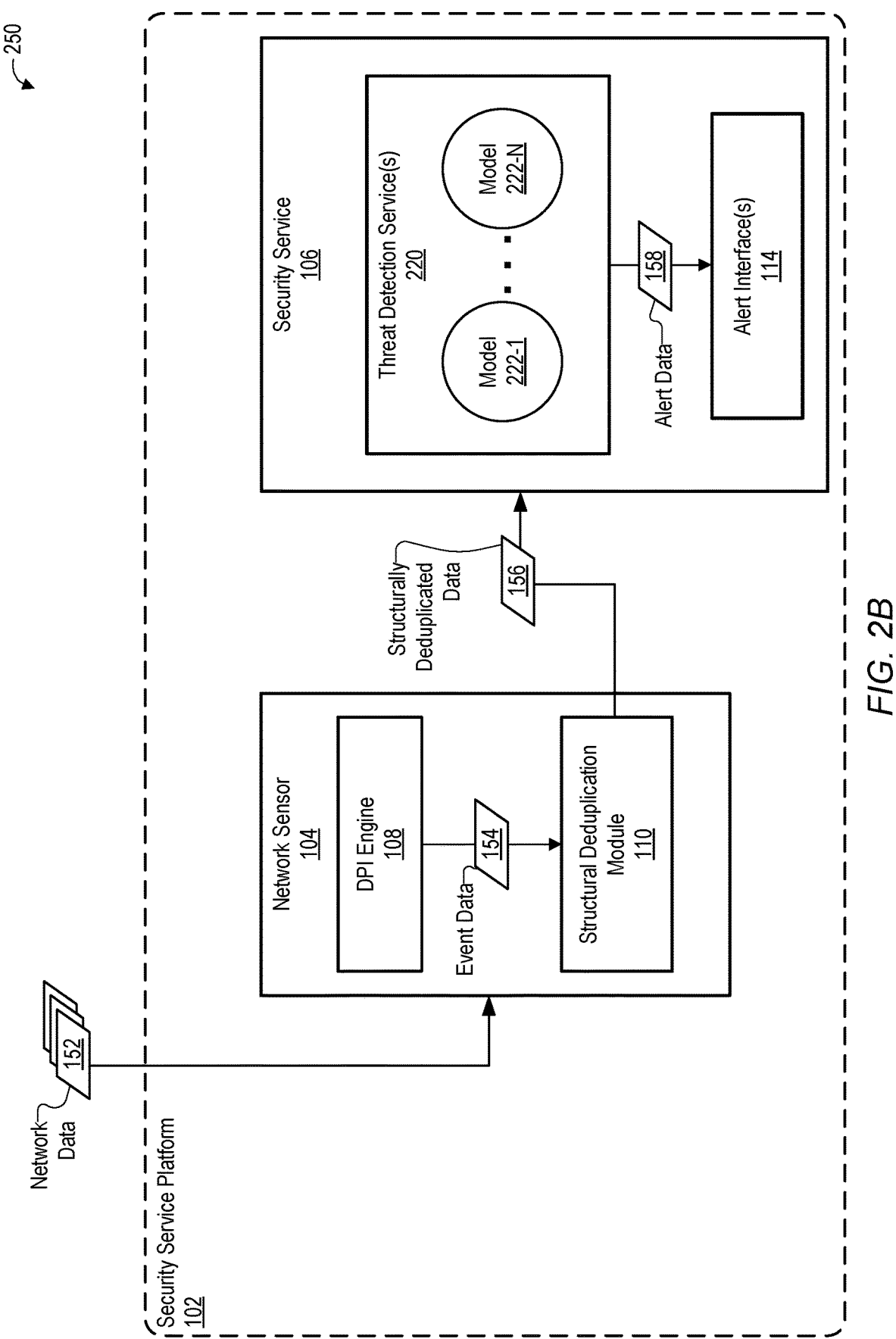
FIG. 2B is a block diagram illustrating an example system architecture for the security service platform, in accordance with some embodiments.

FIG. 2B is a block diagram illustrating an example computing environment 250 that of the security service platform 102 implementing a threat detection service that uses one or more machine learning models, in accordance with some embodiments.

As depicted in FIG. 2A, a security service platform 102 may be implemented similarly to the implementation described with respect to FIG. 1. However, in contrast to the implementation of FIG. 1, in this example, security service platform 102 may use one or more trained machine learning models to detect a cyberattack.

In this implementation, the security service 106 may include a threat detection service 220. The threat detection service 220 may include one or more classifiers, where the one or more classifiers may be trained machine learning models 222-1-222-N. In some examples, the training dataset may be based on input and outputs from the implementations described with respect to FIGS. 1 and 2A.

Continuing this example, a given instance of a structurally deduplicated data 156 may be associated with a specific determination of whether the given instance of structurally deduplicated data 156 is indicative of a cyberattack. In short, the training data may be based on structurally deduplicated data. Over time, a dataset may be developed to generate one or more trained models 220-1-220-N with high accuracy. Using the trained models 220, the security service platform 102 may detect one or more cyberattacks based on the structurally deduplicated data 156. Further, similar to the examples described with respect to FIGS. 1 and 2A, a given instance of event data 154 is not reconstructed to determine whether event data 154 represented within the structurally deduplicated data 156 is indicative of a cyberattack.

Figure 3:
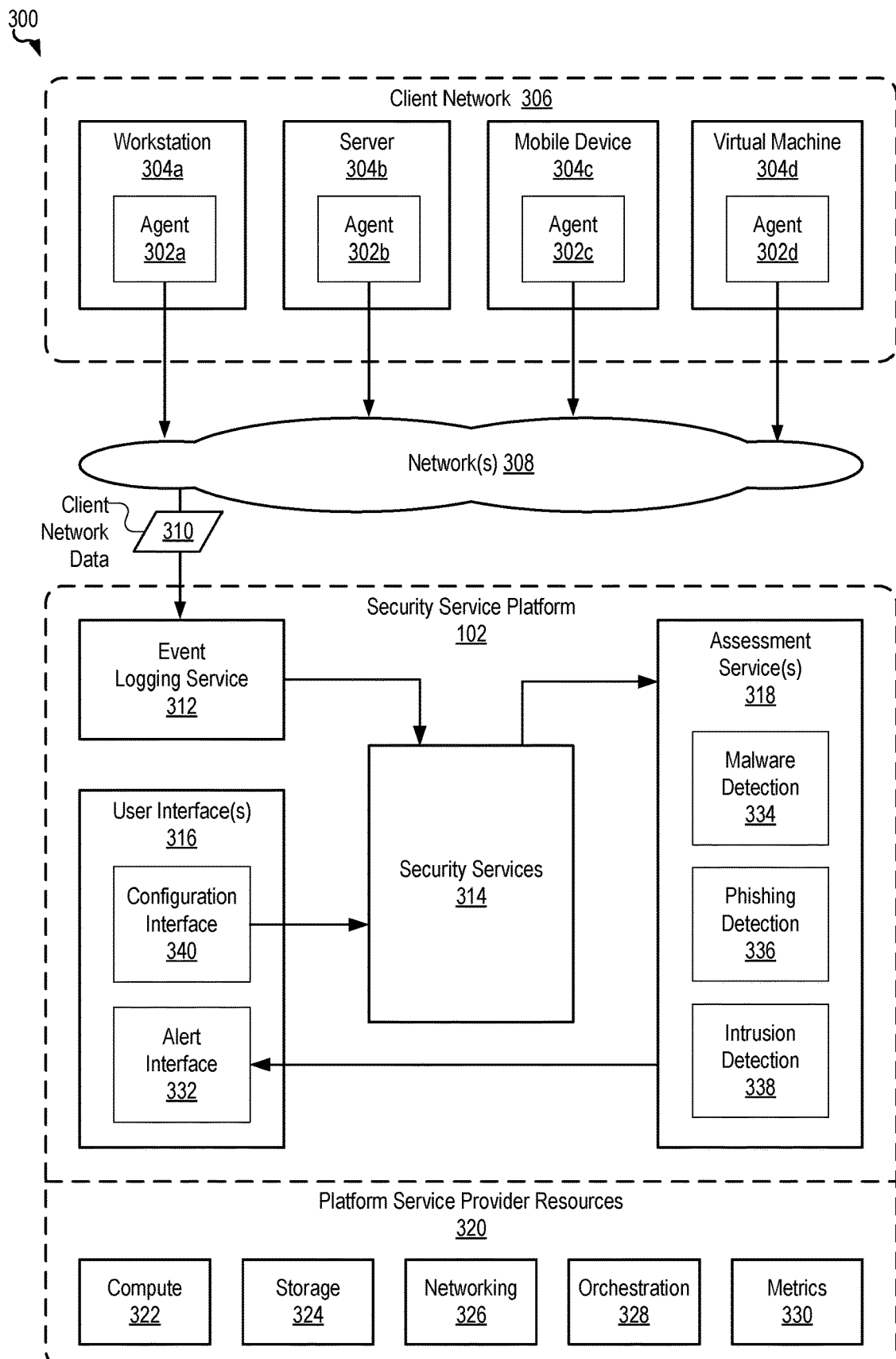
FIG. 3 is a block diagram illustrating example computing resources that implement a security service platform, in accordance with some embodiments.

FIG. 3 is a block diagram illustrating example computing resources that implement a security service platform (e.g., security service platform 102 in FIG. 1) in an example security environment 300, in accordance with some embodiments.

The security service platform 102 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security service platform 102 may be configured to communicate with agents 302a-302d deployed on computing resources 304a-304d in a client network 306.

In this example, the computing resources 304a-304d are depicted as a workstation, a server, a mobile device, and a virtual machine, respectively. In other examples, a computing resource 304 may comprise personal computers, cloud compute instances, laptops, among other types of computing resources, or some other resource that may be vulnerable to a cyberattack. Computing resources are described in greater detail below.

In this example, agents 302 may communicate with the security service platform 102 over one or more intermediary networks 308. In some embodiments, the agents 302 may be configured to collect or compile network activity data or network event data, and transmit the data, depicted as client network data 310, to the security service platform 102. The security service platform 102 may receive network activity data from many different client networks operated by different entities, companies, organizations, groups, etc., and perform remote monitoring of the networks of these different clients.

As shown, the client network 306 in this example includes different types of computing resources, such as a workstation 304a, a server 304b, a mobile device 304c, and a virtual machine 304d. The virtual machine 304d may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure.

Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 304d may be hosted in a platform service provider network, such as the platform service provider network that is hosting the security service platform 102. In some embodiments, the agents 302 may be deployed on other types of computing systems, including embedded systems, networking devices, storage devices, Internet-of-Things (IoT) devices, vehicles, and the like.

In various embodiments, the network 308 may encompass any suitable combination of networking hardware and protocols necessary to enable communications between the agents 302 and the security service platform 102. In some embodiments, the remote machines 304 may execute in a private network of a company, behind a company firewall, and the network 308 may include a public network such as the Internet, which lies outside the firewall. The network 308 may encompass the different telecommunications networks and service providers that collectively implement the Internet.

In some embodiments, the network 308 may also include private networks such as private local area networks (LANs), private wide area networks (WANs), or private wireless networks. The network 308 may be implemented using different hardware (e.g., modems, routers, switches, load balancers, proxy servers, etc.) and software (e.g., protocol stacks, routing software, firewall/security software, etc.) for establishing networking links between the remote machines 304 and the security service platform 102. In some embodiments, the agents 302 may transmit the client network data 310 to the security service platform 102 over secure communication channels such as transport layer security (TLS) connections implemented over the network 308.

As shown in this example, the security service platform 102 is implemented using a number of supporting services 312, 314, 316, and 318 implemented by the platform service provider network. Clients of the security service platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security service platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 320, which can be used by customers to implement hosted services. As shown, the platform service provider may provide resource services such as compute resource service 322, storage resource service 324, networking resources service 326, orchestration service 328, and resource metrics service 330. The services of the security service platform 102 may be built using these underlying resource services provided by the platform service provider.

In some embodiments, the platform service provider resources 390 may implement features such as load balancing of service requests and/or dynamic management and scaling of service node pools. In some embodiments, each of the services 312, 314, 316, and 318 may be implemented using a pool of service nodes provided by the platform service provider, which may be individual instances of virtual machines. In some embodiments, the platform service provider may be a provider such as Amazon Web Services or Microsoft Azure.

In some embodiments, the security service platform 102 may be configured to monitor, analyze, and respond to security-related incidents that are detected in the remote client networks 306. For example, the client network data 310 may indicate network traffic data 120 and/or network sensor processed data 122, where the security service platform 102 may determine a cyberattack as described herein.

In some embodiments, the security service platform 102 may implement an event logging service 312 that receives client network data 310 from a client network 306 and stores the received data. The event logging service 312 may implement service functionality to allow users or other software components to query the event logs.

As shown, in some embodiments, the assessment service(s) 318 may implement a variety of monitoring processes to generate alerts in response to detected security problems in the client network 306. These alerts may be forwarded to an alert interface 332, which may allow human security analysts to perform a more in-depth examination of any underlying security problems. For example, in some embodiments, a malware detection module 334 may examine collected machine event logs to detect installation of a particular type of malware executable.

As another example, a phishing detection module 336 may examine the email event logs to detect phishing attacks using new or unusual email addresses, web addresses, or email content. As yet another example, an intrusion detection module 338 may examine the network event logs to detect suspicious communication patterns or attacker packet signatures. In some embodiments, the alerts generated by the assessment service(s) 318 may trigger automated mitigation actions to be performed on the client network 306 to address detected threats in the client network.

In some embodiments, the security service platform 102 may implement one or more user interface(s) 316, which may be implemented as GUIs or web interfaces viewable using a web browser. In some embodiments, these user interfaces 316 may be implemented by client-side applications. As shown, the user interfaces may include the alert interface 332 to notify users of detected alerts. In some embodiments, the alert interface 332 may be accessible from both the client network 306 and a central monitoring location where security analysts are monitoring the client network.

In some embodiments, the user interface(s) 316 may also implement a configuration interface 340. The configuration interface 340 may be used to configure various aspects of the security service platform 102, including the security service 314. For example, the configuration interface 340 may be used to control various aspects of how the security service 314 operates, including initiating a scan, indicating one or more computing resources, and/or specifying a scanning schedule.

In some implementations, the security service platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security service platform 102 may comprise multiple services. For example, the security service platform 102 may comprise services implemented by containerized applications operating on one or more nodes of a cluster. In this example, the security service platform 102 may be implemented by one or more containerized applications.

Figure 4A:
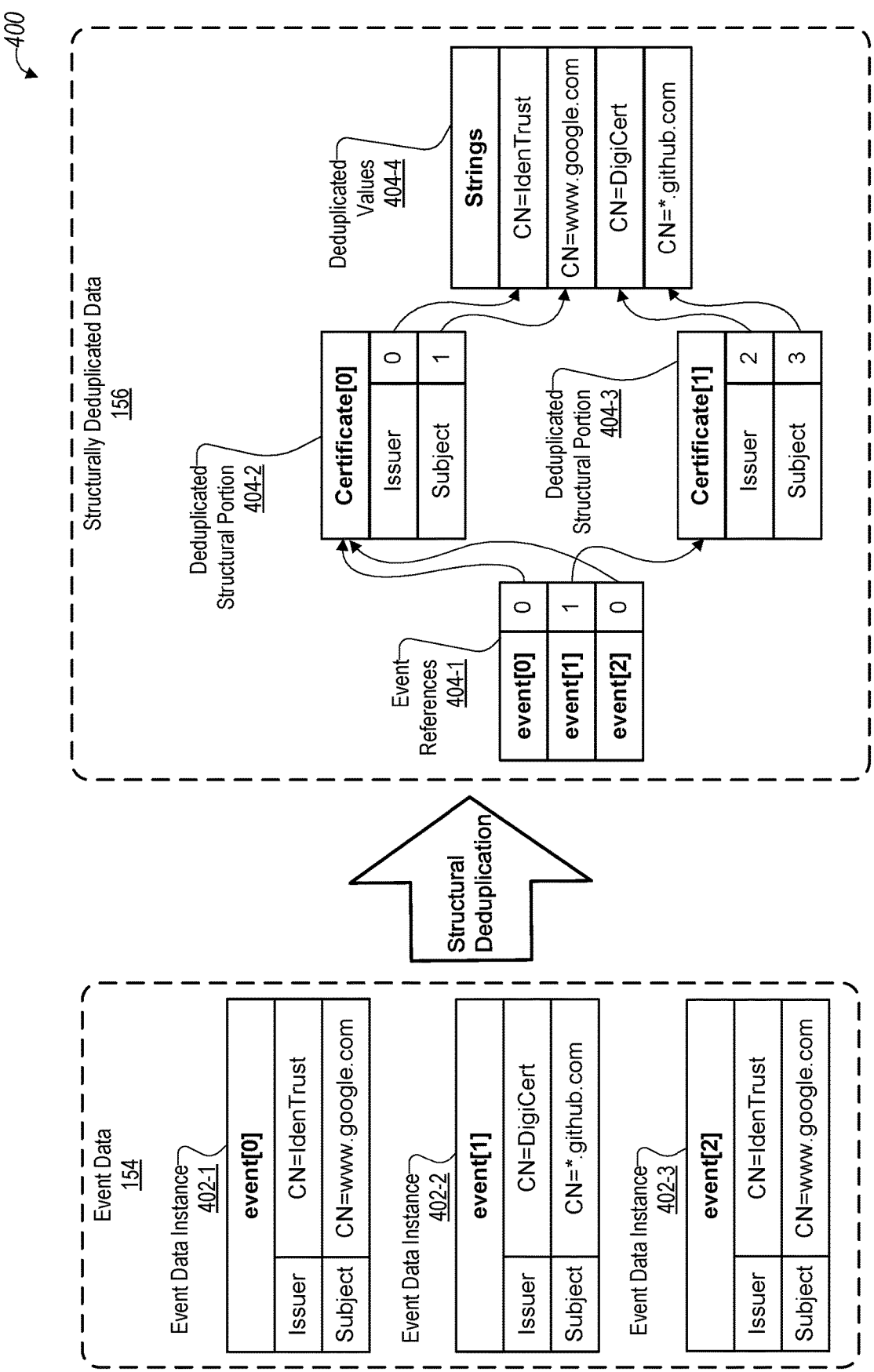
FIG. 4A is a block diagram depicting data formats of event data and of structurally deduplicated event data, in accordance with some embodiments.

FIG. 4A is a block diagram 400 depicting data formats of event data and of structurally deduplicated event data, in accordance with some embodiments.

In some implementations, a format for structurally deduplicated data depends on redundancy across subsets of a structure by which input data is organized. A structure by which data is organized may be referred to as a data format. In this example, for simplicity, event data is depicted as having two fields, an "Issuer" field and a "Subject" field. In general, input data may have additional fields, different types of fields, include one or more types of data structures, and one or more levels of nesting.

In some implementations, fields may have a large range of possible values, however, in practice in any given network only a subset of the possible values may occur with any frequency. Such a subset of possible values allows for efficient structural deduplication. In other words, deduplication magnitude may be based on the characteristic that in a network the same data may repeatedly appear in different network events.

In some implementations, nonredundant data, such as strings, may be stored in a table or data structure of the structurally deduplicated data instead of being stored directly in a data structure that includes an entire event data instance. As depicted in FIG. 4A, the structural deduplication module 110 may store all nonredundant strings in a single table of deduplicated values 404-4, where one or more portions of structurally deduplicated data may include references to the table.

In some implementations, redundant data, such as portions of the event data 154 that are repeated across multiple event data instances 402, may be restructured into a format that is based on the repetitive portions of the original data format. For example, as depicted in FIG. 4A, the event data 154 may include three event data instances 402-1-402-3. Each event data instance 402 may include two fields, where the first event data instance 402-1 and the third event data instance 402-3 may include the same data values for a same subset, or portion, of the original data, or event data instance.

Continuing this example, each instance of event data may correspond to a representation of the instance in the structurally deduplicated data 156, where in this example, that representation is a table, or list, of event references 404-1. In this example, the repeated portions of the event data instances may correspond to certificates, which are depicted as deduplicated structural portions 404-2 and 404-3. As depicted, based on the first and third event data instances 402-1 and 402-3 including the same certificate data, both the first and third event references event[0] and event[2] include references to a same certificate[0], depicted as deduplicated structural portion 404-2. The second event data instance 402-2 includes structural portions that are not redundant with other event data instances, and consequently, there is only a single reference to the deduplicated structural portion 404-3 associated for the certificate[1], where the deduplicated structural portion 404-3 for certificate[1] includes data corresponding to event data reference for event[1] in the event data references 404-1. In this example, references are implemented as values next to a table entry that are indexes into another table.

For example, event[0] in event references 404-1 includes an index value of 0 that indexes into a table entry of certificate [0], depicted by deduplicated structural portion 404-2, which in turn includes an index value of 0 for the "Issuer" table entry, which in turn indexes into the deduplicated values 404-4 table of strings, which resolves as value "CN=IdenTrust". However, generally, a reference may be implemented by other computer language features, such as a pointer, hash value, or other type of data or memory referencing functionality.

As event data 154 arrives at the structural data deduplication module 110, redundant fields for each respective event data 154 structure may be grouped into a portion (in this example "Issuer" and "Subject" are grouped as a "Certificate"). The string attributes of these portions, or deduplicated structural portions, are then checked against deduplicated values 404-4, which in this example is depicted as a "Strings" table. If the string is not represented by the deduplicated values 404-4, then the string is added to the deduplicated values 404-4, and the new index may be returned. Otherwise, if the string already exists in the deduplicated values 404-4, then the existing index is returned, ensuring entries in the deduplicated values 404-4 remain nonredundant.

In this example, a similar process may occur at the "Certificate" level, or deduplicated structural portion level, as can be seen with event[2] which after checking against the deduplicated values 404-4 produces a certificate identical to that of event[0]. In this example, event[2] ends up using the same certificate index as event[0], illustrating how more complex data structures may be deduplicated.

Continuing this example, a similar process may be performed recursively on more complex structures, such as for TLS data clients, servers and certificates. In some examples, each structure type may include its own uniquely populated table.

Figure 4B:
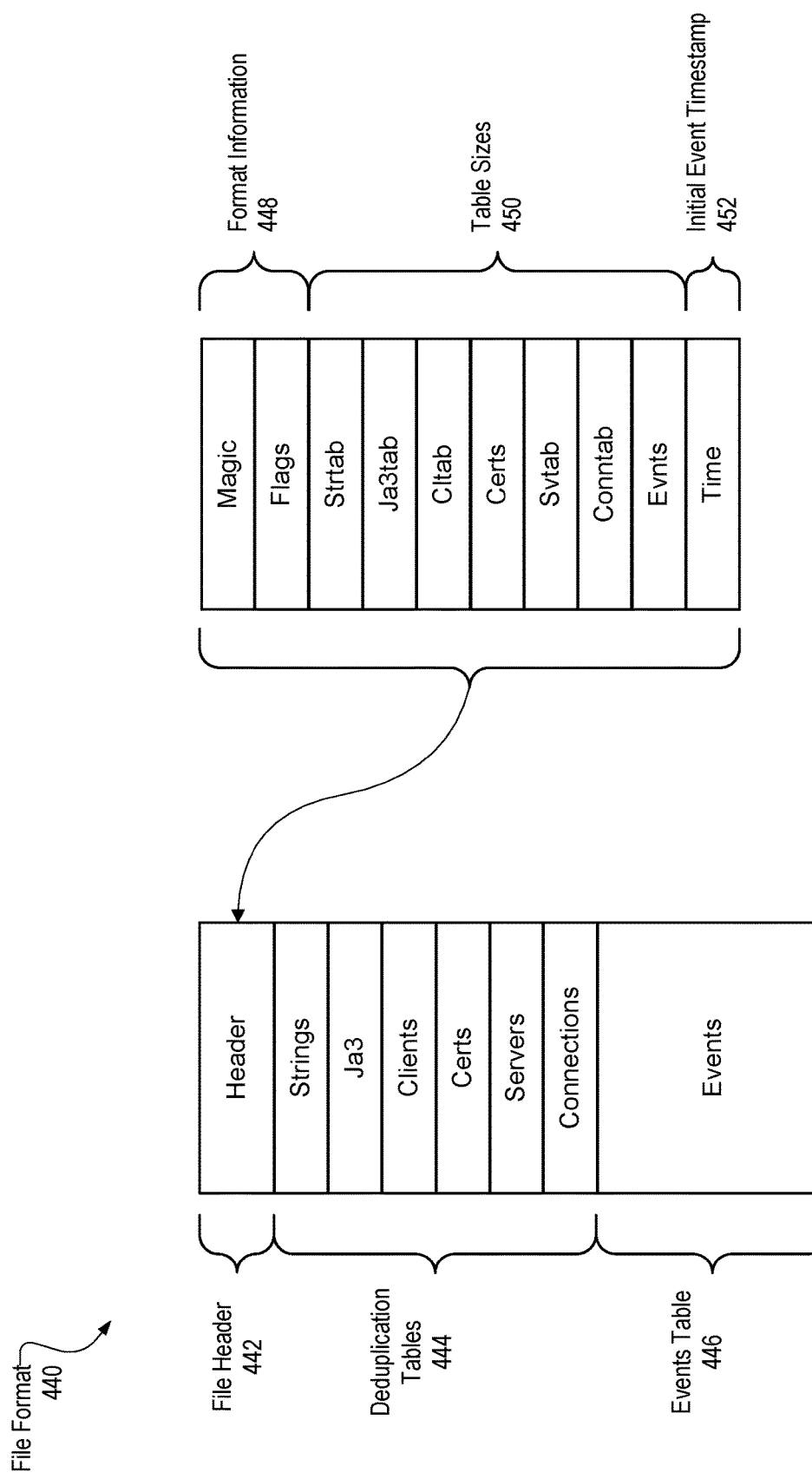
FIG. 4B is a block diagram of a file format associated with structurally deduplicated event data, in accordance with some embodiments.

FIG. 4B is a block diagram of a file format 440 associated with structurally deduplicated event data, in accordance with some embodiments.

The structurally deduplicated data 156 may be stored in various file formats. For example, as depicted in FIG. 4B, file format 440 includes a file header 442, deduplication tables 444, and an events table 446. The file header 446 may include format information 448, table sizes 450, and initial event timestamp 452. In some implementations, some information that is not used for rule matching may be compressed and not included as part of the deduplication tables 444. As one example, in contrast to the depicted example in FIG. 4B, "Connections" within the Deduplication Tables 444 may be grouped as part of Events Table 446 and compressed.

Continuing this example with respect to the file header 442, there may be indications of various metadata associated with the structurally deduplicated data 156. The format information 448 may include entries for "Magic", which may specify a file identification value, and "Flags", which may be used to select granularity of event timestamps, an indication of additional compression to event tables, among other configurable indications of how the file format 440 is storing structurally deduplicated data 156.

Table sizes 450 may include values specifying table sizes for each of the structurally deduplicated portions described with respect to FIG. 4A, including "Strtab" (strings table), "Ja3tab" (Ja3 table), "Cltab" (client hello table), "Certs" (certificate table), "Svtab" (server hello table), "Conntab" (distinct connection table), and "Evnts" (number of entries or event data instances). Initial event timestamp 452 may include a timestamp associated with a first event data instance within a time window that includes multiple event data instances represented by the structurally deduplicated data 156.

The deduplication tables 444 of the file format 440 may specify a plurality of different portions of the data format for event data 154. While the example described with respect to FIG. 4A included two fields, in general, event data may include any number of fields of data that may be useful to determine an indication of a cyberattack. In this example, there may be deduplicated structural portions represented as tables for "Strings", "Ja3", "Clients", "Certs" (certificates), "Servers", and "Connections". In other examples, there may be additional deduplication tables.

Events table 446 may include a list of event data instances. In this example, each event data instance within a given table entry may include one or more references to one or more deduplicated structural portions, and/or one or more references to deduplicated values.

Figure 4C:
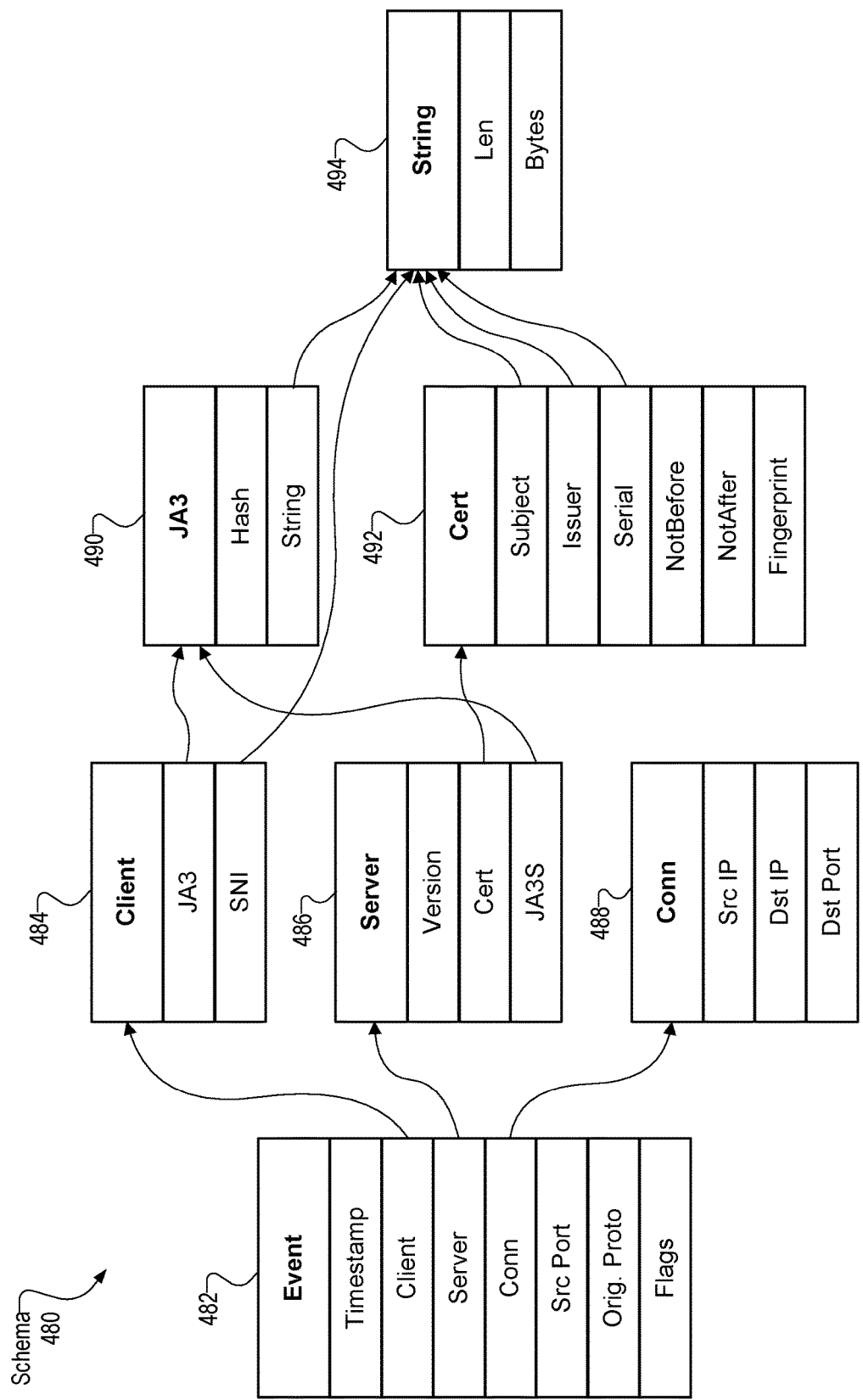
FIG. 4C is a block diagram of an example schema associated with structurally deduplicated event data, in accordance with some embodiments.

FIG. 4C is a block diagram of an example schema 480 associated with structurally deduplicated event data, in accordance with some embodiments.

As described above with respect to FIGS. 4A and 4B, event data 154 may be structured in accordance with various data formats, and may include various numbers and types of fields. In this example, a more complete schema 480 is depicted, where the schema 480 includes multiple levels of deduplicated structural portions of the original event data 154.

In this example, an event data instance 482 may be one of multiple event data instances within structurally deduplicated data 156. In this example, there are levels of structure within the original event data instance, where the levels of structure for event data 482. In this example, for a given instance of event data 482, there are a plurality of deduplicated structural portions, and deduplicated values. The plurality of deduplicated structural portions include a client table 484, a server table 486, a conn table 488, a JA3 table 490, and a cert table 492. The deduplicated values include string table 494.

Continuing this example, the levels of structure include an event data instance 482, which includes a reference to a client table 484 associated with a "Client" field, where the client table 484 includes a "JA3" field that references the JA3 table 490, where the JA3 table 490 includes a reference to the strings table 494. The determination of deduplicated structural portions and assignment of references is described in greater detail with respect to FIGS. 4A and 4B. Additional examples of fields of the event data instance 482 referencing structural portions are depicted, where the relationships are similar to those described for the client reference from the event data instance 482 to the client table 484.

Figure 5A:
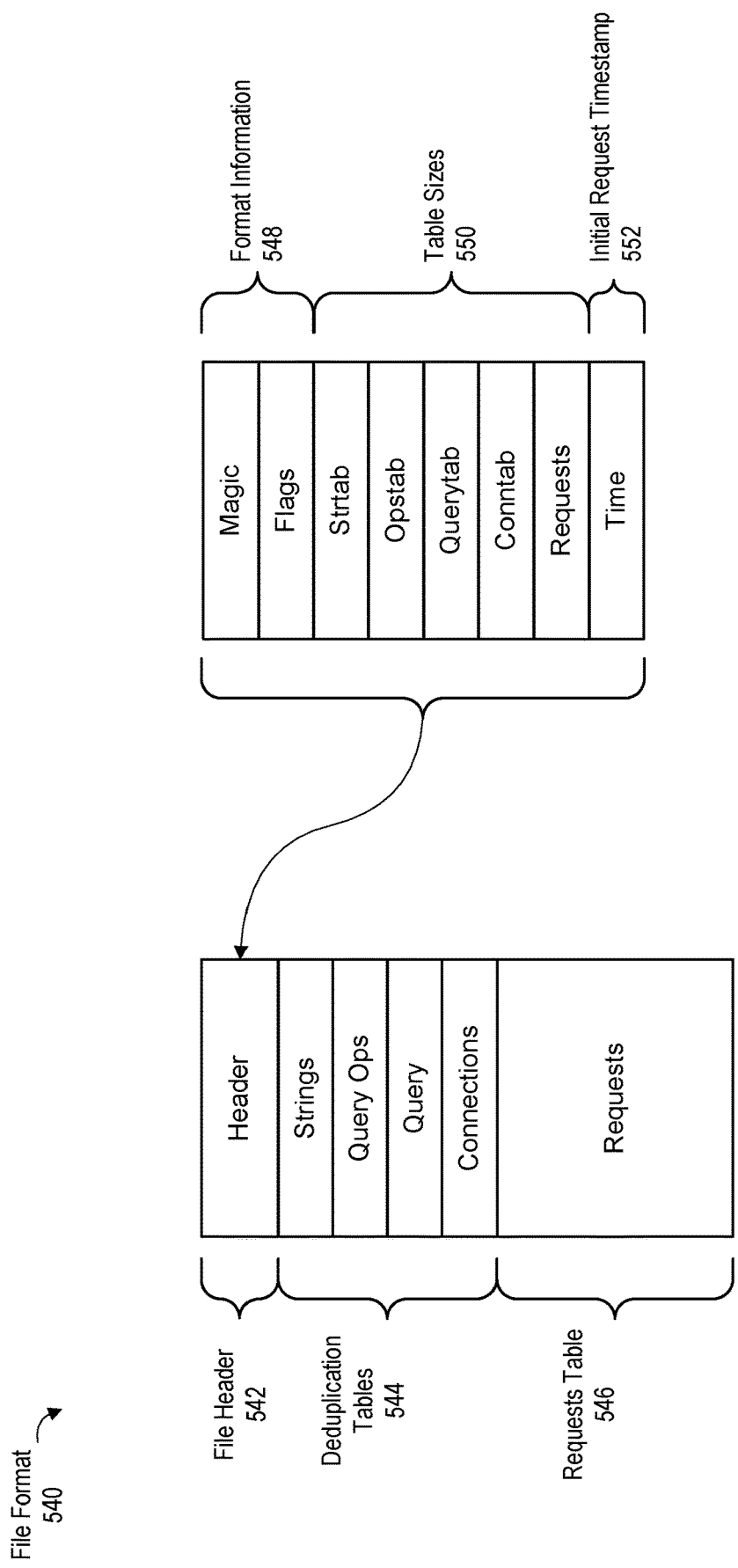
FIG. 5A is a block diagram of a file format associated with structurally deduplicated domain name service (DNS) data, in accordance with some embodiments.

FIG. 5A is a block diagram of a file format 540 associated with structurally deduplicated domain name service (DNS) data, in accordance with some embodiments.

The structurally deduplicated data 156 may correspond to different original data formats in dependence on the type of original data being stored, and may be stored in various formats. In this example, the structurally deduplicated data 156 may represent structurally deduplicated DNS data. The format for storing DNS data may be different than the format for storing event data, which is described with respect to FIGS. 4A-4C.

Figure 5B:
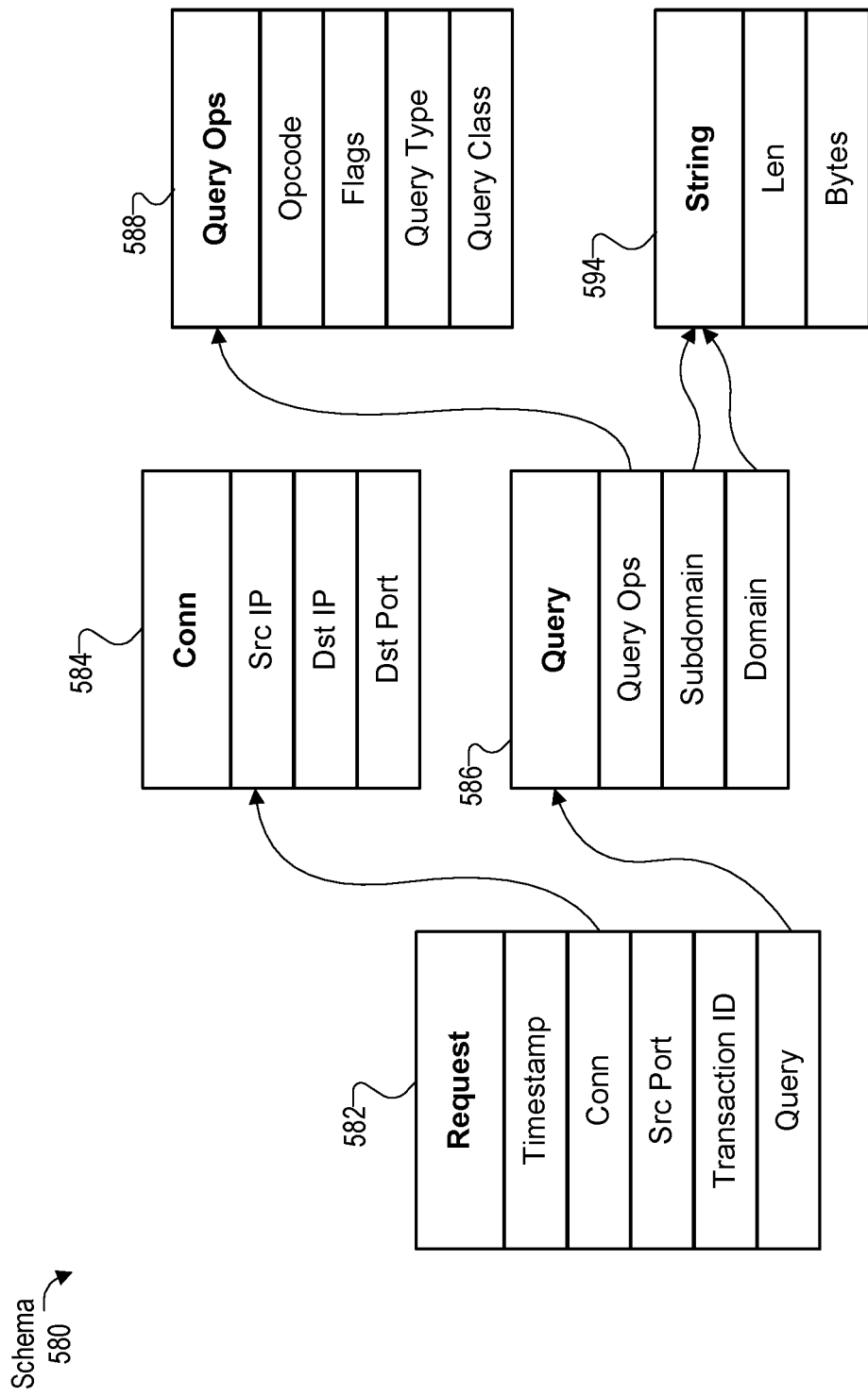
FIG. 5B is a block diagram of an example schema associated with structurally deduplicated DNS data, in accordance with some embodiments.

In this example, as depicted in FIG. 5B, file format 540 includes a file header 542, deduplication tables 544, and a requests table 546. The file header 546 may include format information 548, table sizes 550, and initial request timestamp 552.

Continuing this example with respect to the file header 542, there may be indications of various metadata associated with the structurally deduplicated data 156. The format information 548 may include entries for "Magic", which may specify a file identification value, and "Flags", which may be used to select granularity of DNS request timestamps, an indication of additional compression to requests tables, among other configurable indications of how the file format 540 is storing structurally deduplicated data 156.

Table sizes 550 may include values specifying table sizes for each of the structurally deduplicated portions of the original data format, including "Strtab" (strings table), "Opstab" (query ops table), "Querytab" (query table), and "Conntab" (distinct connection table), and "requests" (number of DNS requests). Initial request timestamp 552 may include a timestamp associated with a first DNS data instance within a time window that includes multiple DNS data instances represented by the structurally deduplicated data 156.

The deduplication tables 544 of the file format 540 may specify a plurality of different portions of the data format for DNS data. While the example described includes a particular set of fields, in general, DNS data may include any number of fields of data that may be useful to determine an indication of a cyberattack. In this example, there may be deduplicated structural portions represented as tables for "Strings", "Query Ops", "Query", and "Connections". In other examples, there may be additional or fewer deduplication tables.

Requests table 546 may include a list of DNS data instances. In this example, each DNS data instance within a given table entry may include one or more references to one or more deduplicated structural portions, and/or one or more references to deduplicated values.

FIG. 5B is a block diagram 580 of an example schema 480 associated with structurally deduplicated DNS data, in accordance with some embodiments.

The structurally deduplicated data 156 may correspond to different original data formats in dependence on the type of original data being stored, and may be stored in various formats, and may include various numbers and types of fields. In this example, a schema 580 is depicted, where the schema 580 includes multiple levels of deduplicated structural portions of original DNS data.

In this example, an DNS data instance 582 may be one of multiple DNS data instances within structurally deduplicated data 156. In this example, there are levels of structure within the original DNS data instance. In this example, for a given instance of DNS data 582, there are a plurality of deduplicated structural portions, and deduplicated values. The plurality of deduplicated structural portions include a conn table 584, a query table 586, and a query ops table 588. The deduplicated values include string table 594.

Continuing this example, the levels of structure include an DNS data instance 582, which includes a reference to a query table 586 associated with a "Query" field, where the query table 586 includes a "Query Ops" field that references the query ops table 588, where the query ops table 588 includes a reference to the strings table 594. The determination of deduplicated structural portions and assignment of references is described in greater detail with respect to FIGS. 4A and 4B. Additional examples of fields of data instances referencing structural portions are depicted, where the relationships are similar to those described for the client reference from the event data instance 482 to the client table 484.

Figure 6A:
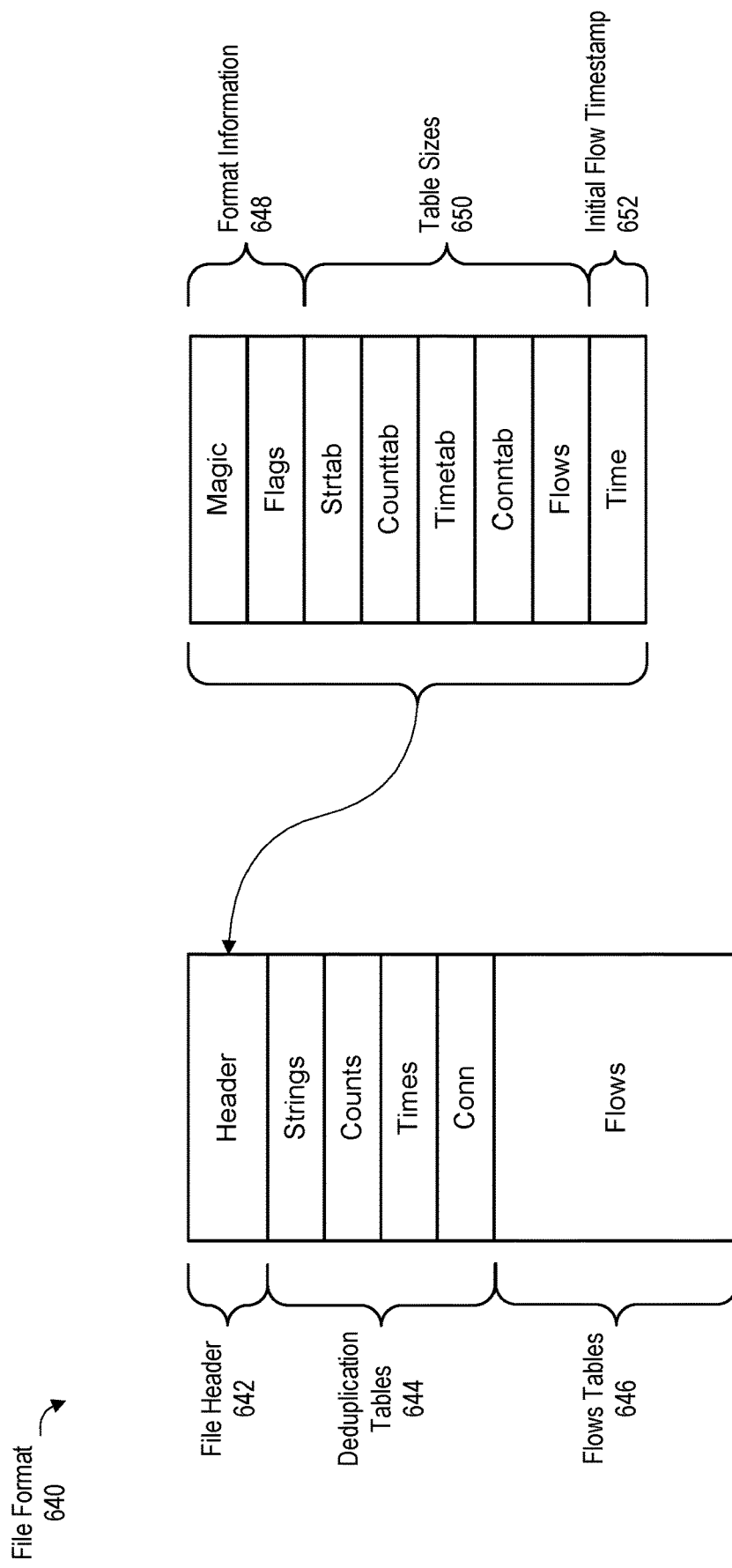
FIG. 6A is a block diagram of a file format associated with structurally deduplicated flow data, in accordance with some embodiments.

FIG. 6A is a block diagram 600 of a file format associated with structurally deduplicated flow data, in accordance with some embodiments.

The structurally deduplicated data 156 may correspond to different original data formats in dependence on the type of original data being stored, and may be stored in various formats. In this example, the structurally deduplicated data 156 may represent structurally deduplicated flow data, which may describe network flow events, such as data at specific point in a network (e.g., switch, router, port). The format for storing flow data may be different than the format for storing event data, which is described with respect to FIGS. 4A-4C.

Figure 6B:
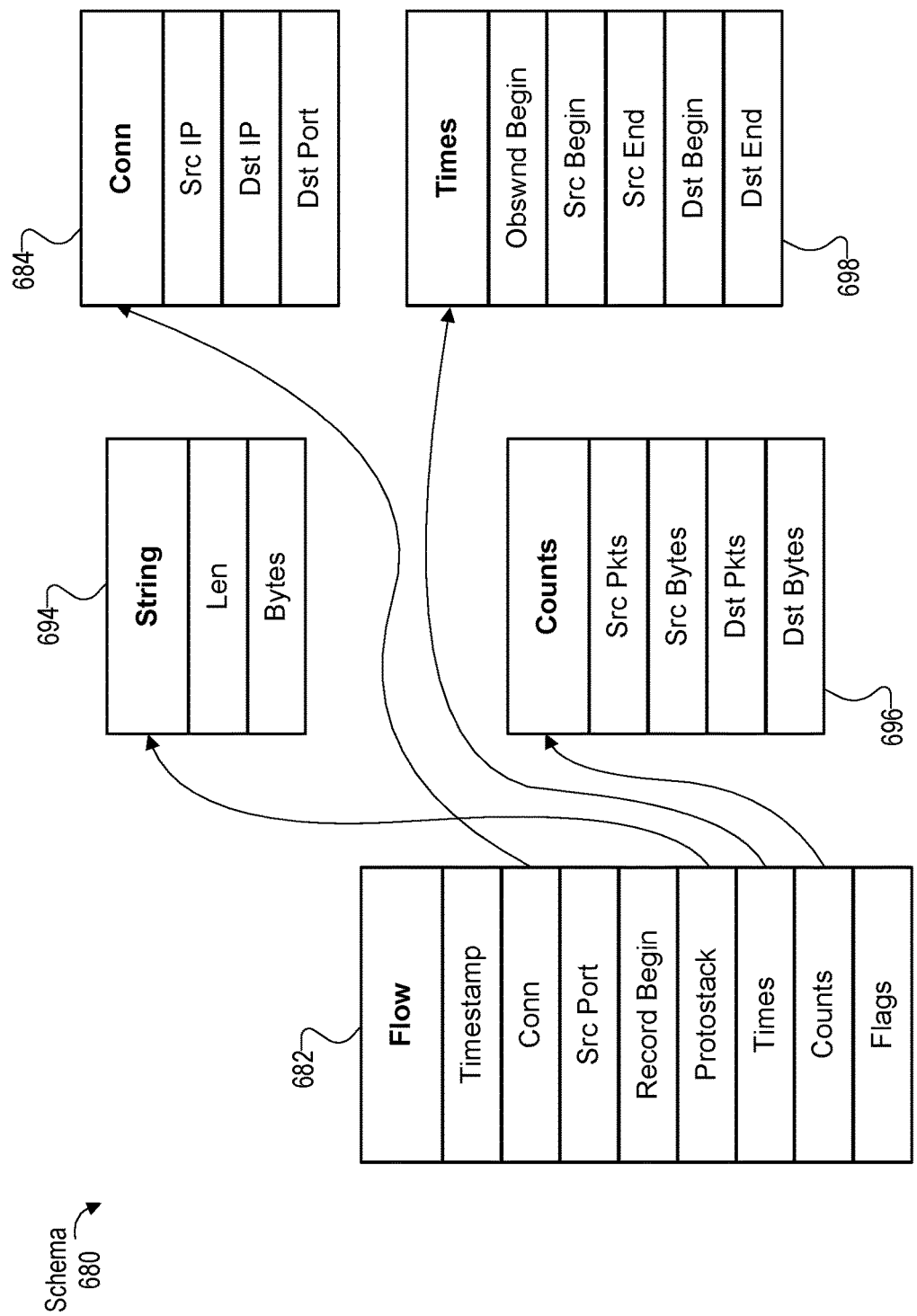
FIG. 6B is a block diagram of an example schema associated with structurally deduplicated flow data, in accordance with some embodiments.

In this example, as depicted in FIG. 6B, file format 640 includes a file header 642 and deduplication tables 644. The file header 642 may include format information 648, table sizes 650, and initial flow timestamp 652.

Continuing this example with respect to the file header 642, there may be indications of various metadata associated with the structurally deduplicated data 156. The format information 648 may include entries for "Magic", which may specify a file identification value, and "Flags", which may be used to select granularity of flow data timestamps, an indication of additional compression to flow tables, among other configurable indications of how the file format 640 is storing structurally deduplicated data 156.

Table sizes 650 may include values specifying table sizes for each of the structurally deduplicated portions of the original data format, including "Strtab" (strings table), "Counttab" (counts table), "Timetab" (times table), and "Conntab" (distinct connection table), and "Flows" (flow data). Initial flow timestamp 652 may include a timestamp associated with a first flow data instance within a time window that includes multiple flow data instances represented by the structurally deduplicated data 156.

The deduplication tables 644 of the file format 640 may specify a plurality of different portions of the data format for flow data. While the example described includes a particular set of fields, in general, flow data may include any number of fields of data that may be useful to determine an indication of a cyberattack. In this example, there may be deduplicated structural portions represented as tables for "Strings", "Counts", "Times", and "Conn". In other examples, there may be additional or fewer deduplication tables.

Flows table 646 may include a list of flow data instances. In this example, each flow data instance within a given table entry may include one or more references to one or more deduplicated structural portions, and/or one or more references to deduplicated values.

FIG. 6B is a block diagram of an example schema 680 associated with structurally deduplicated flow data, in accordance with some embodiments.

The structurally deduplicated data 156 may correspond to different original data formats in dependence on the type of original data being stored, and may be stored in various formats, and may include various numbers and types of fields. In this example, a schema 680 is depicted, where the schema 680 includes multiple levels of deduplicated structural portions of original flow data.

In this example, a flow data instance 682 may be one of multiple flow data instances within structurally deduplicated data 156. In this example, there are levels of structure within the original flow data instance. In this example, for a given instance of flow data 682, there are a plurality of deduplicated structural portions, and deduplicated values. The plurality of deduplicated structural portions include a conn table 684, a counts table 696, and a times table 698. The deduplicated values include string table 694.

Continuing this example, the levels of structure include a flow data instance 682, which includes a reference to a conn table 684 associated with a "Conn" field. The determination of deduplicated structural portions and assignment of references is described in greater detail with respect to FIGS. 4A and 4B. Additional examples of fields of data instances referencing structural portions are depicted, where the relationships are similar to those described for the client reference from the event data instance 482 to the client table 484.

Turning toward FIGS. 7A-7E, the structurally deduplicated data 156 may correspond to different original data formats, for different types of original data (e.g., event data, DNS data, flow data) in dependence on the type of original data being stored, and may be stored in various formats. In the following implementations, the structural deduplication module 110 of the security service platform 102 may deduplicate multiple data types into a combined format. The multiple data types to be combined to generate a schema for the structurally deduplicated data, where the schema is based on two or more of the data formats associated with: event data described with respect to FIGS. 1-4C, DNS data described with respect to FIGS. 5A-5B, and flow data described with respect to FIGS.>6A-6B.

In the following embodiments, FIG. 7A describes a first version of a file format associated with structurally deduplicated combined data, FIG. 7B describes a first version of a schema for combined data, FIG. 7C describes a second version of a schema for combined data, FIG. 7D describes a third version of a file format associated with structurally deduplicated combined data, and FIG. 7E describes a third version of a schema for combined data.

Figure 7A:
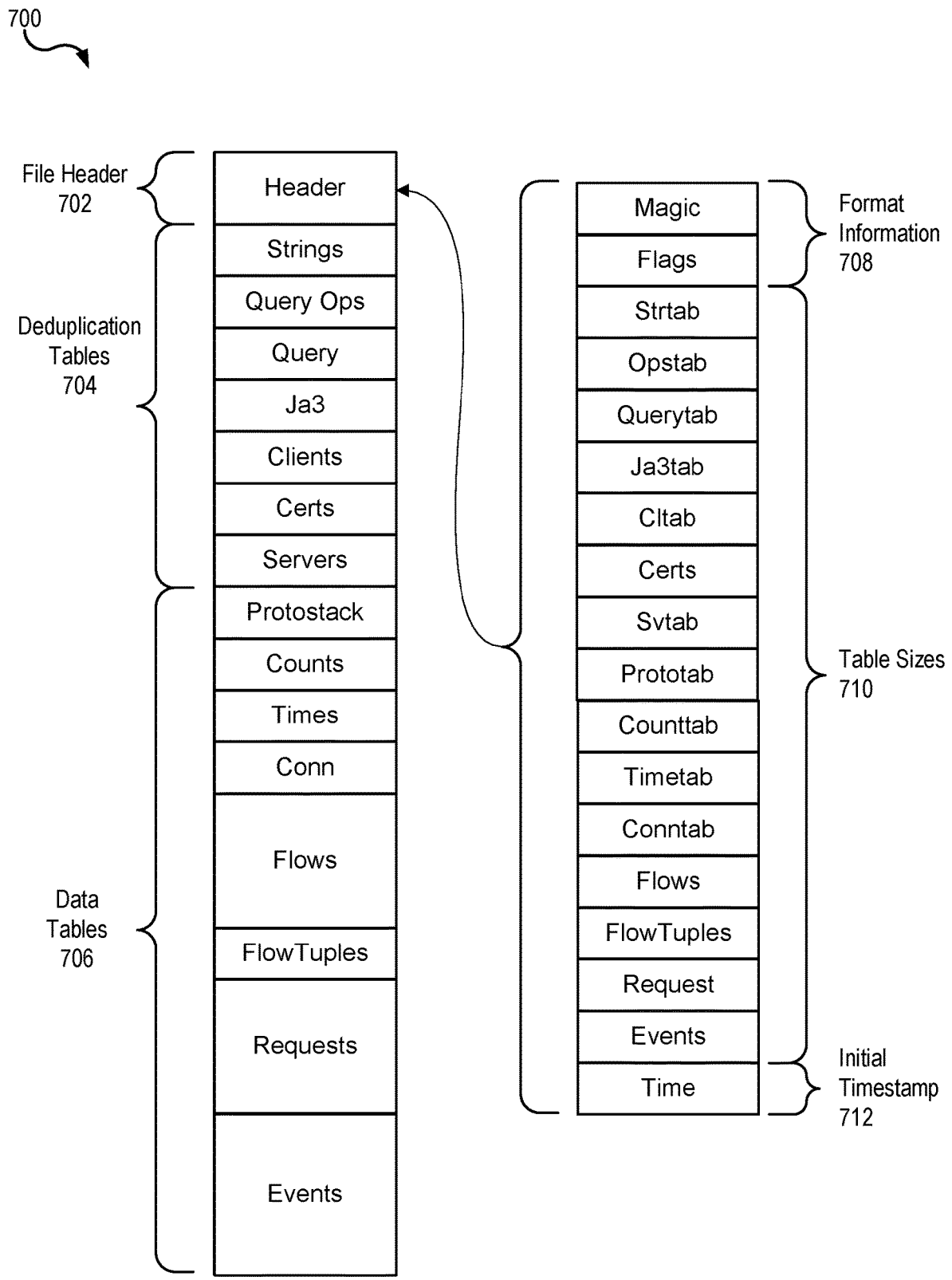
FIG. 7A is a block diagram of a first version of a file format associated with structurally deduplicated combined data, in accordance with some embodiments.

FIG. 7A is a block diagram 700 of a first version of a file format associated with structurally deduplicated combined data, in accordance with some embodiments.

In this example, DNS data and event data (e.g., event data associated with TLS events) may be generated from packets which also form a network flow. Therefore, each DNS and TLS event may have a matching flow event. In this implementation, the structural deduplication module 110 identifies matching DNS/TLS events and flows so that the redundant data between them may be structurally deduplicated. Redundant data may include IP addresses and/or ports.

In some implementations, matching DNS events to event data may be based on shared data fields including IP address and ports, with use of event timestamps. For example, to determine a DNS/event match, first the IP addresses and ports of the event and flow are compared. For example, the comparison may be of a tuple of the Conn table index and the source port. If the comparison indicates a match, then the timestamps are checked to see if the event's timestamp fits in the timestamp range provided by the duration of the flow. If the timestamp fits in the timestamp range, then the flow and event are determined to be matched.

Continuing this example, in response to the structural deduplication module 110 receiving a flow, the flow may be added to a table. If the flow is a TLS or DNS flow (determined by values in the flow's protostack), then the flow may be compared against the list of unmatched TLS/DNS events, where any matches may be processed and added to the respective tables. In this example, a matched event may be removed from the list of unmatched events, as a given event may only match to a single flow. In this example, the flow itself may then be added to the list of previously seen flows.

In this example, in response to the structural deduplication module 110 receiving a TLS or DNS event, the received TLS or DNS event may be compared to the previous flow list. In this example, if the TLS or DNS event matches a previous flow, then the TLS or DNS event may be processed in a respective table. In this example, the flow is not removed from a flow list as flows may match to multiple events. Further, if the TLS or DNS event does not match to any previous flows, the TLS or DNS event may be added to the unmatched events list until the arrival of a corresponding flow.

In this example, as depicted in FIG. 7A, file format 700 includes a file header 702, deduplication tables 704, and data tables 706. The file header 702 may include format information 708, table sizes 710, and initial timestamp 712.

Continuing this example with respect to the file header 702, there may be indications of various metadata associated with the structurally deduplicated data 156. The format information 708 may include entries for "Magic", which may specify a file identification value, and "Flags", which may be used to select granularity of flow data timestamps, an indication of additional compression to flow tables, among other configurable indications of how the file format 700 is storing structurally deduplicated data 156.

Table sizes 710 may include values specified table sizes for each of the structurally deduplicated portions of the original data format, including "Strtab", "Opstab", "Querytab", "Ja3tab", "Cltab", "Certs", "Svtab", "Prototab", "Counttab", "Timetab", "Conntab", "Flows", "FlowTuples", "Request", "and "Events". Initial timestamp 712 may include a timestamp associated with a first flow data instance within a time window that includes multiple flow data instances represented by the structurally deduplicated data 156.

The deduplication tables 704 of the file format 700 may specify a plurality of different portions of the multiple data formats for the combined data. While the example described includes a particular set of fields, in general, combined data may include any number of fields of data that may be useful to determine an indication of a cyberattack. In this example, there may be deduplicated structural portions represented as tables for "Strings", "Query Ops", "Query", "Ja3", "Clients", "Certs", and "Servers". In other examples, there may be additional or fewer deduplication tables.

Data tables 706 may include tables for one or more combined data instances. In this example, the data tables 706 includes "Protostack", "Counts", "Times", "Conn", "Flows", "FlowTuples", "Requests", and "Events", which may correspond to one or more fields of the original data types, including one or more of event data, DNS data, and/or flow data. As described above with respect to FIG. 4B, in some implementations, different fields may be included within the Deduplication Tables, such as Deduplication Tables 704. For example, "Protostack", "Counts", "Times", and "Conn", may be grouped within Deduplication Tables 704.

Figure 7B:
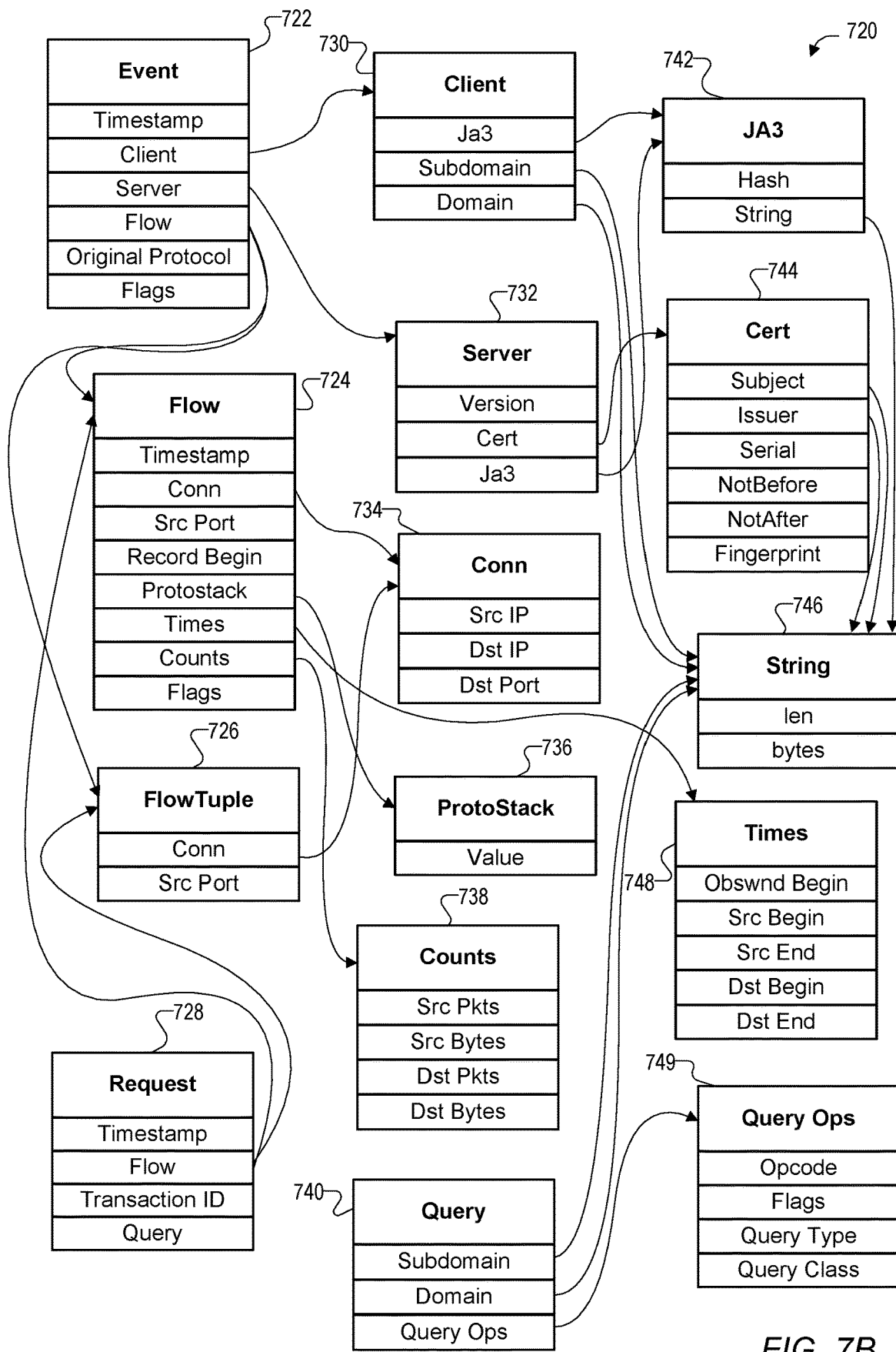
FIG. 7B is a block diagram of an example schema associated with a first file version for structurally deduplicated combined data, in accordance with some embodiments.

FIG. 7B is a block diagram of an example schema 720 associated with a first file version for structurally deduplicated combined data, in accordance with some embodiments.

In this example, of particular interest in the schema are the links to the Flow and FlowTuple tables. The FlowTuple table may be used as, depending on the "payload window", to match a given event to a respective flow in which the event occurred. "Payload window" may refer to a period of time during which data for a structurally deduplicated data 156 may be included. In some examples, based on how flow events are generated separately to TLS and DNS events, it may be possible for the flow and matching events to end up in different instances of structurally deduplicated data 156. In this case, unmatched events may be processed into their respective tables using a flow tuple generated from an event's IP address or ports.

The structurally deduplicated data 156 may correspond to different original data formats in dependence on the type of original data being stored, and may be stored in multiple, combined formats, and may include various numbers and types of fields. In this example, a schema 720 associated with the first file version described with respect to FIG. 7A is depicted, where the schema 720 includes multiple levels of deduplicated structural portions of original combined data.

In this example, combined data may include data for one or more instances of original data from the combined data represented by structurally deduplicated data 156. In this example, there are levels of structure, including for different data type structures of the different combined data types, within the original combined data. In this example, there are a plurality of deduplicated structural portions, and deduplicated values. The plurality of deduplicated structural portions include tables for Event 722, Flow 724, FlowTuple 726, Request 728, Client 730, Server 732, Conn 734, Counts 738, Query 740, JA3 742, Cert 744, Times 748, and Query Ops 749. The deduplicated values are stored within tables associated with String 746 and ProtoStack 736.

Continuing this example, the portions of deduplicated structure may be reconstructed to form the original data based on relationships and references between the tables. The determination of deduplicated structural portions and assignment of references is described in greater detail with respect to FIGS. 4A and 4B. Additional examples of fields of data instances referencing structural portions are depicted, where the relationships are similar to those described for the client reference from the event data instance 482 to the client table 484.

Figure 7C:
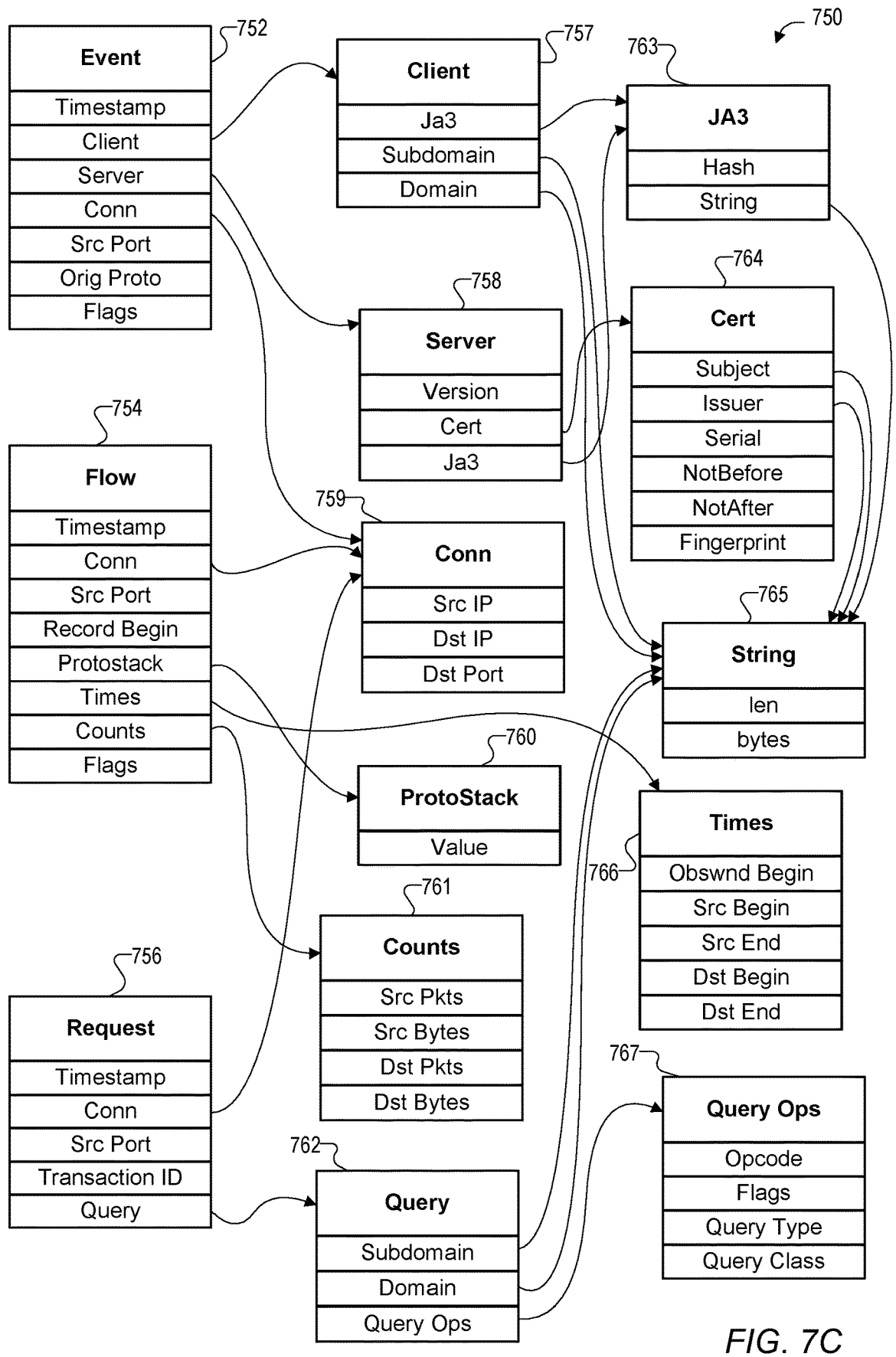
FIG. 7C is a block diagram of an example schema associated with a second file version for structurally deduplicated combined data, in accordance with some embodiments.

FIG. 7C is a block diagram of an example schema 750 associated with a second file version for structurally deduplicated combined data, in accordance with some embodiments. Schema 750 is a second example schema for the first file version described with respect to FIG. 7A, where the schema 750 is a second example with respect to the first schema 720 described with respect to FIG. 7B.

In this second example of a schema for the first file version, the structurally deduplicated data 156 may correspond to different original data formats in dependence on the type of original data being stored, and may be stored in multiple, combined formats, and may include various numbers and types of fields. In this example, a second schema 750 associated with the first file version described with respect to FIG. 7A is depicted, where the schema 750 includes multiple levels of deduplicated structural portions of original combined data.

In this example, combined data may include data for one or more instances of original data from the combined data represented by structurally deduplicated data 156. In this example, there are levels of structure, including for different data type structures of the different combined data types, within the original combined data. In this example, there are a plurality of deduplicated structural portions, and deduplicated values. The plurality of deduplicated structural portions include tables for Event 752, Flow 754, Request 756, Client 757, Server 758, Conn 759, Counts 761, Query 762, JA3 763, Cert 764, Times 766, and Query Ops 767. The deduplicated values are stored within tables associated with String 765 and ProtoStack 760.

Continuing this example, the portions of deduplicated structure may be reconstructed to form the original data based on relationships and references between the tables. The determination of deduplicated structural portions and assignment of references is described in greater detail with respect to FIGS. 4A and 4B. Additional examples of fields of data instances referencing structural portions are depicted, where the relationships are similar to those described for the client reference from the event data instance 482 to the client table 484.

Figure 7D:
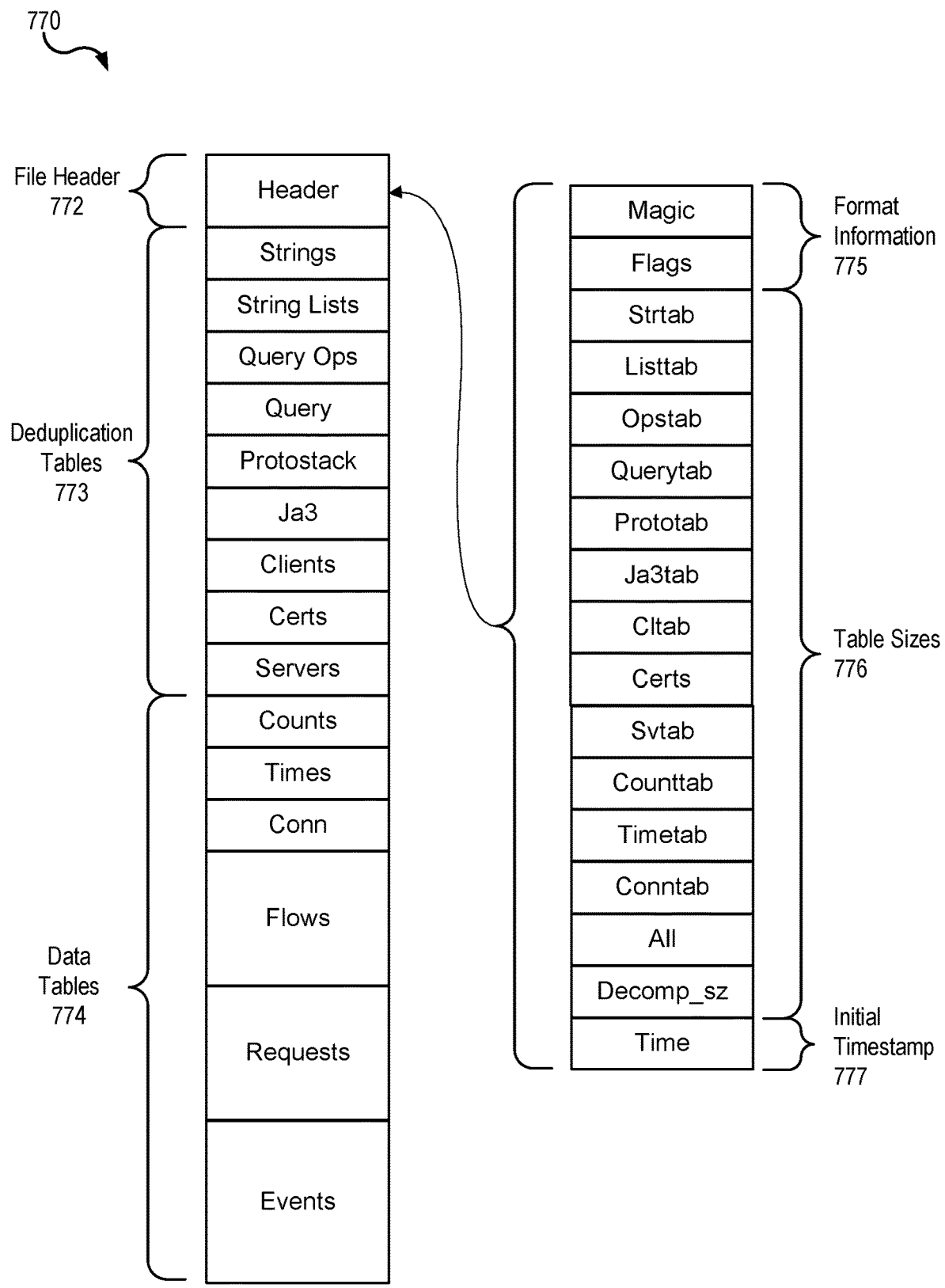
FIG. 7D is a block diagram of a second version of a file format associated with structurally deduplicated combined data, in accordance with some embodiments.

FIG. 7D is a block diagram 770 of a second version of a file format associated with structurally deduplicated combined data, in accordance with some embodiments.

In this example, similar to the example file format described with respect to FIG. 7A, DNS data and event data (e.g., event data associated with TLS events) may be generated from packets which also form a network flow.

In this example, as depicted in FIG. 7D, file format 770 includes a file header 772, deduplication tables 773, and data tables 774. The file header 772 may include format information 775, table sizes 776, and initial timestamp 777.

Continuing this example with respect to the file header 772, there may be indications of various metadata associated with the structurally deduplicated data 156. The format information 775 may include entries for "Magic", which may specify a file identification value, and "Flags", which may be used to select granularity of flow data timestamps, an indication of additional compression to flow tables, among other configurable indications of how the file format 775 is storing structurally deduplicated data 156.

Table sizes 776 may include values specified table sizes for each of the structurally deduplicated portions of the original data format, including "Strtab", "Listtab", "Opstab", "Querytab", "Prototab", "Ja3tab", "Cltab", "Certs", "Counttab", "Timetab", "Conntab", "All", and "Decomp_sz". Initial timestamp 777 may include a timestamp associated with a first flow data instance within a time window that includes multiple flow data instances represented by the structurally deduplicated data 156.

The deduplication tables 773 of the file format 770 may specify a plurality of different portions of the multiple data formats for the combined data. While the example described includes a particular set of fields, in general, combined data may include any number of fields of data that may be useful to determine an indication of a cyberattack. In this example, there may be deduplicated structural portions represented as tables for "Strings", "String Lists", "Query Ops", "Query", "Protostack", "Ja3", "Clients", "Certs", and "Servers". In other examples, there may be additional or fewer deduplication tables.

Data tables 774 may include tables for one or more combined data instances. In this example, the data tables 776 includes "Counts", "Times", "Conn", "Flows", "Requests", and "Events", which may correspond to one or more fields of the original data types, including one or more of event data, DNS data, and/or flow data. As described above with respect to FIG. 4B, in some implementations, different fields may be included within the Deduplication Tables. For example, "Counts", "Times", and "Conn", may be grouped within Deduplication Tables 773.

Figure 7E:
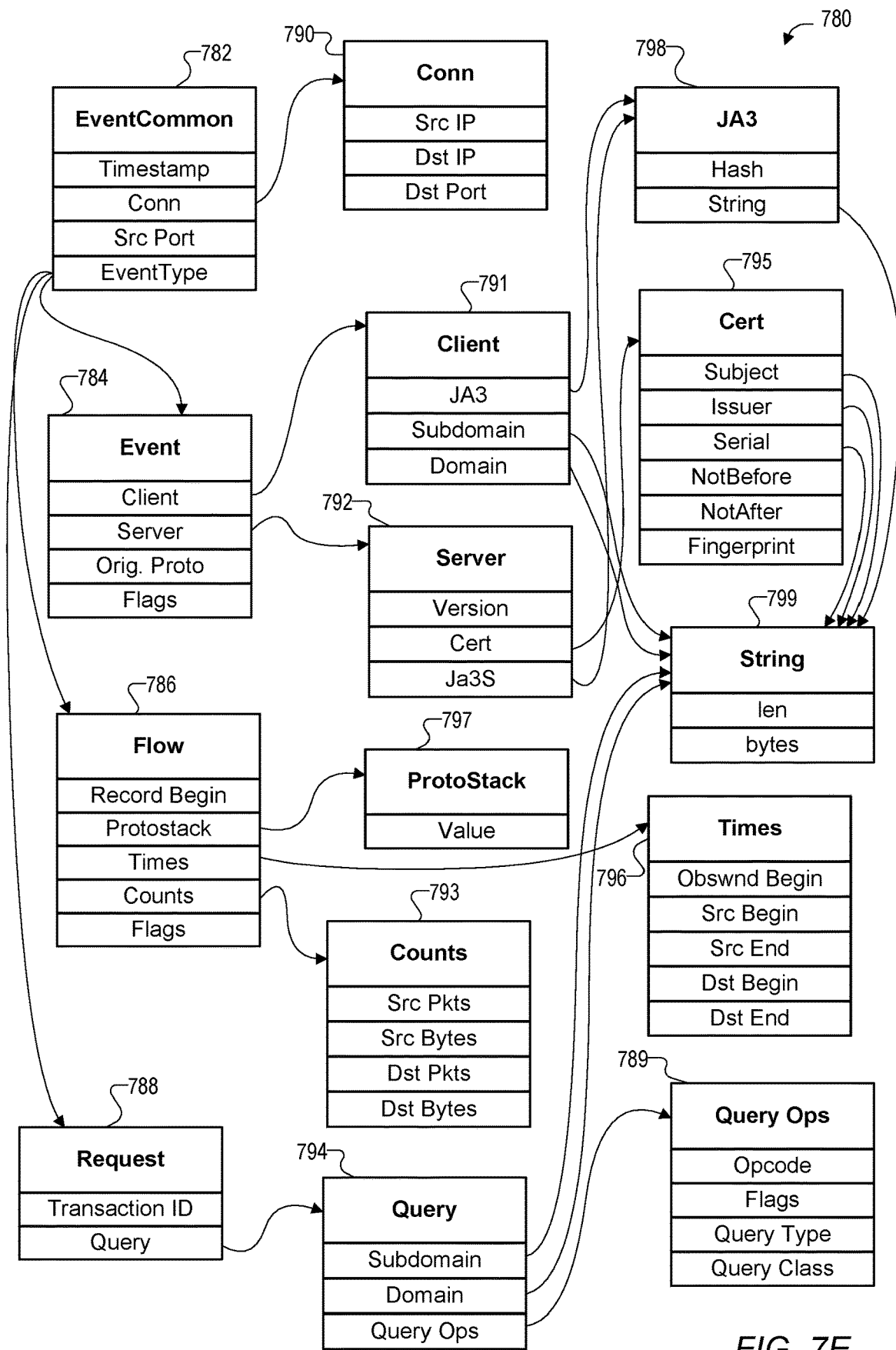
FIG. 7E is a block diagram of an example schema associated with a second file version for structurally deduplicated combined data, in accordance with some embodiments.

FIG. 7E is a block diagram of an example schema 780 associated with a second file version for structurally deduplicated combined data, in accordance with some embodiments. Schema 780 is a third example schema, and a first for the second file version described with respect to FIG. 7D, where the schema 780 is a third example with respect to the second schema 750 described with respect to FIG. 7C.

In this example of a schema for the second file version, the structurally deduplicated data 156 may correspond to different original data formats in dependence on the type of original data being stored, and may be stored in multiple, combined formats, and may include various numbers and types of fields. In this example, a schema 780 associated with the second file version described with respect to FIG. 7D is depicted, where the schema 780 includes multiple levels of deduplicated structural portions of original combined data.

In this example, combined data may include data for one or more instances of original data from the combined data represented by structurally deduplicated data 156. In this example, there are levels of structure, including for different data type structures of the different combined data types, within the original combined data. In this example, there are a plurality of deduplicated structural portions, and deduplicated values. The plurality of deduplicated structural portions include tables for EventCommon 782, Event 784, Flow 786, Request 788, Conn 790, Client 791, Server 792, Counts 793, Query 794, Cert 795, Times 796, and Query Ops 789. The deduplicated values are stored within tables associated with ProtoStack 797 JA3 798, and String 799.

In this example, the data structure "EventCommon" may hold the fields common to all event types: timestamp, connection and source port. The common data fields may be used to determine which events may be included within the combined data. Use of EventCommon allows for an additional optimization by the way the EventCommon structure allows for arbitrary numbers of bytes to be read following the EventCommon structure. In some examples, this is important due to time jumps, which are cases where the time delta between two events is too large to be stored in the allocated 32-bit timestamp field of the event. In some cases, there are many examples where indexes are oversized for the data provided, so as a consequence some space is "wasted". The use of extended storage for data allows for the index size of each table to be set dynamically at time generated the structurally deduplicated data 156 as determined by the sizes of the deduplication tables. This will remove issues of index oversizing, saving a significant portion of space.

Continuing this example, the portions of deduplicated structure may be reconstructed to form the original data based on relationships and references between the tables. The determination of deduplicated structural portions and assignment of references is described in greater detail with respect to FIGS. 4A and 4B. Additional examples of fields of data instances referencing structural portions are depicted, where the relationships are similar to those described for the client reference from the event data instance 482 to the client table 484.

FIG. 8 is a depiction of an example rule 800 associated with a network security threat, in accordance with some embodiments.

As described with respect to FIG. 1, the security service platform 102 may use one or more rules 116 to determine whether network activity is indicative of a cyberattack or indicative of a threat level. As one example, Suricata rules may be used. As depicted in FIG. 8, an example rule may include a rule head 802, metadata 804, rule options 806, rule options 810, and metadata 812 indicative of a class type. As described with respect to FIGS. 1-4C, rules 116 may be periodically uploaded from a repository.

In some implementations, the rule matching service 112 may compile one or more rules, such as the rule depicted in FIG. 8, and compile the one or more rules using a series of algebraic transformations. For example, the algebraic transformations may include tokening input (e.g., rule head, rule options), grouping options and modifiers, converting rules into an IR to capture rule semantics, partitioning rules into rulesets for a hook-point, where each ruleset may be transformed into a backend-independent RTL, and translating RTL into machine code, such as a C program. The compiled program may generate an executable file, or binary, that may be used for rule matching. Tokenization may include tokenizing a rule into component parts, such as a rule head, rule options, among other component parts.

Figure 9:
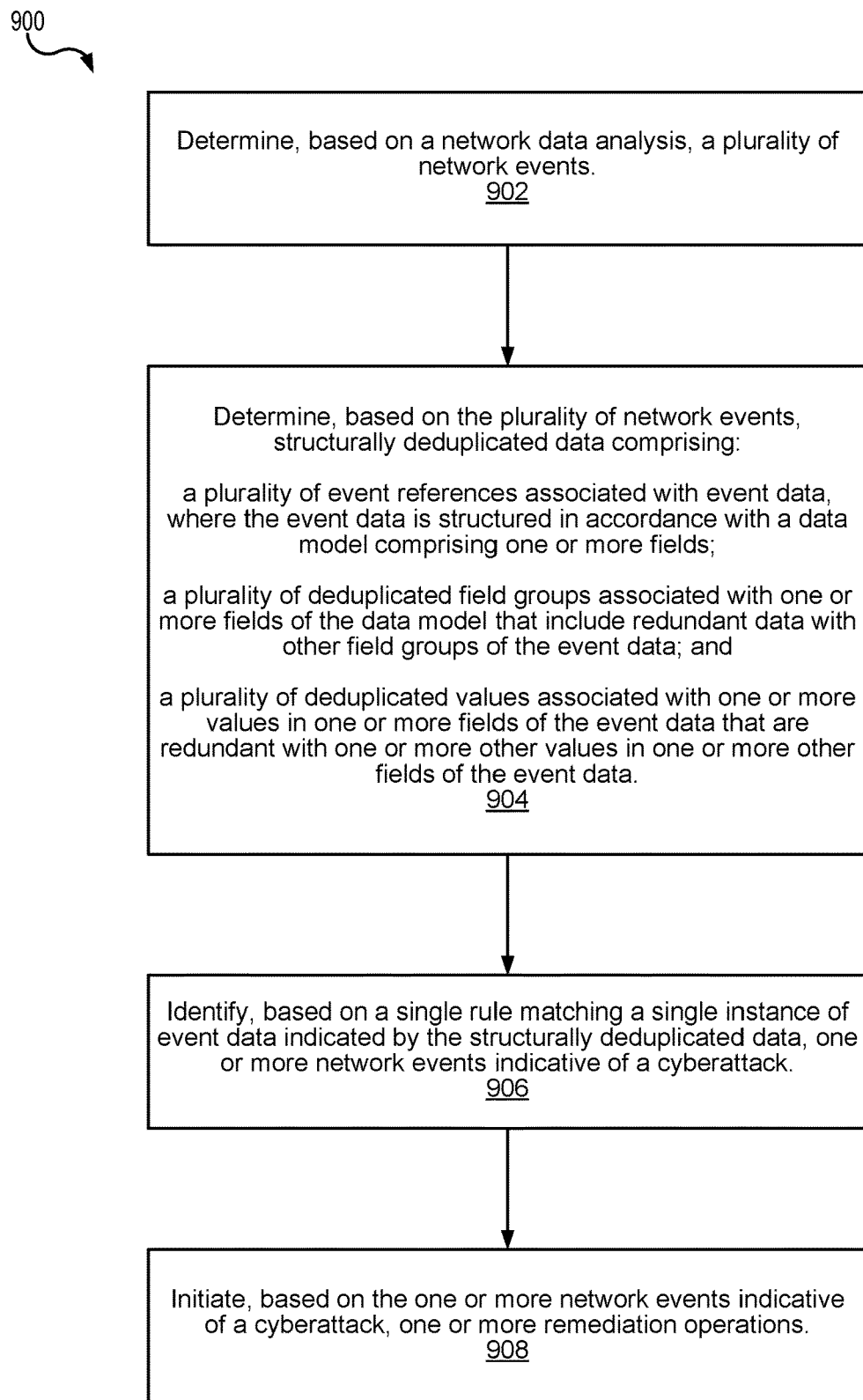
FIG. 9 is flowchart that illustrates an example of the security service platform, in accordance with some embodiments.

FIG. 9 is flowchart 900 that illustrates an example of the security service platform 102, in accordance with some embodiments. In FIG. 9, one or more hardware processors may be used to implement the example process, where the hardware processors are described with respect to FIGS. 3 and 13.

FIG. 9 illustrates an example process that includes: determining, at 902, based on a network traffic analysis, a plurality of network events; determining, at 904, based on the plurality of network events, structurally deduplicated data comprising: a plurality of event references associated with event data, wherein the event data is structured in accordance with a data model comprising one or more fields; a plurality of deduplicated field groups associated with one or more fields of the data model that include redundant data with other field groups of the event data; a plurality of deduplicated values associated with one or more values in one or more fields of the event data that are redundant with one or more other values in one or more other fields of the event data; identifying, at 906, based on a single rule matching a single instance of event data indicated by the structurally deduplicated data, one or more network events indicative of a cyberattack; and initiating, at 908, based on the one or more network events indicative of a cyberattack, one or more remediation operations.

Determining, at 902, based on a network traffic analysis, a plurality of network events may be carried out as described with respect to FIGS. 1-8. For example, the network sensor 104 may determine a plurality of network events 154 based on network data 152.

Determining, at 904, based on the plurality of network events, structurally deduplicated data may be carried out as described with respect to FIGS. 1-8. For example, the structural deduplication module 110 may determine structurally deduplicated data 156, including various types of structurally deduplicated data 156, as described with respect to FIGS. 4-8.

Identifying, at 906, based on a single rule matching a single instance of event data indicated by the structurally deduplicated data, one or more network events indicative of a cyberattack may be carried out as described with respect to FIGS. 1-8. For example, the security service 106, based on the rule matching service 112, rules 116 and/or blocklist 118, may determine that one or more network events indicated by the structurally deduplicated data 156 are indicative of a cyberattack.

Initiating, at 908, based on the one or more network events indicative of a cyberattack, one or more remediation operations may be carried out as described with respect to FIGS. 1-4. For example, the rule matching service 112 may provide alert data 158 to an alert interface 114, where the alert interface 114 may handle the alert data 158 in various ways, including a user interface alert.

Figure 10:
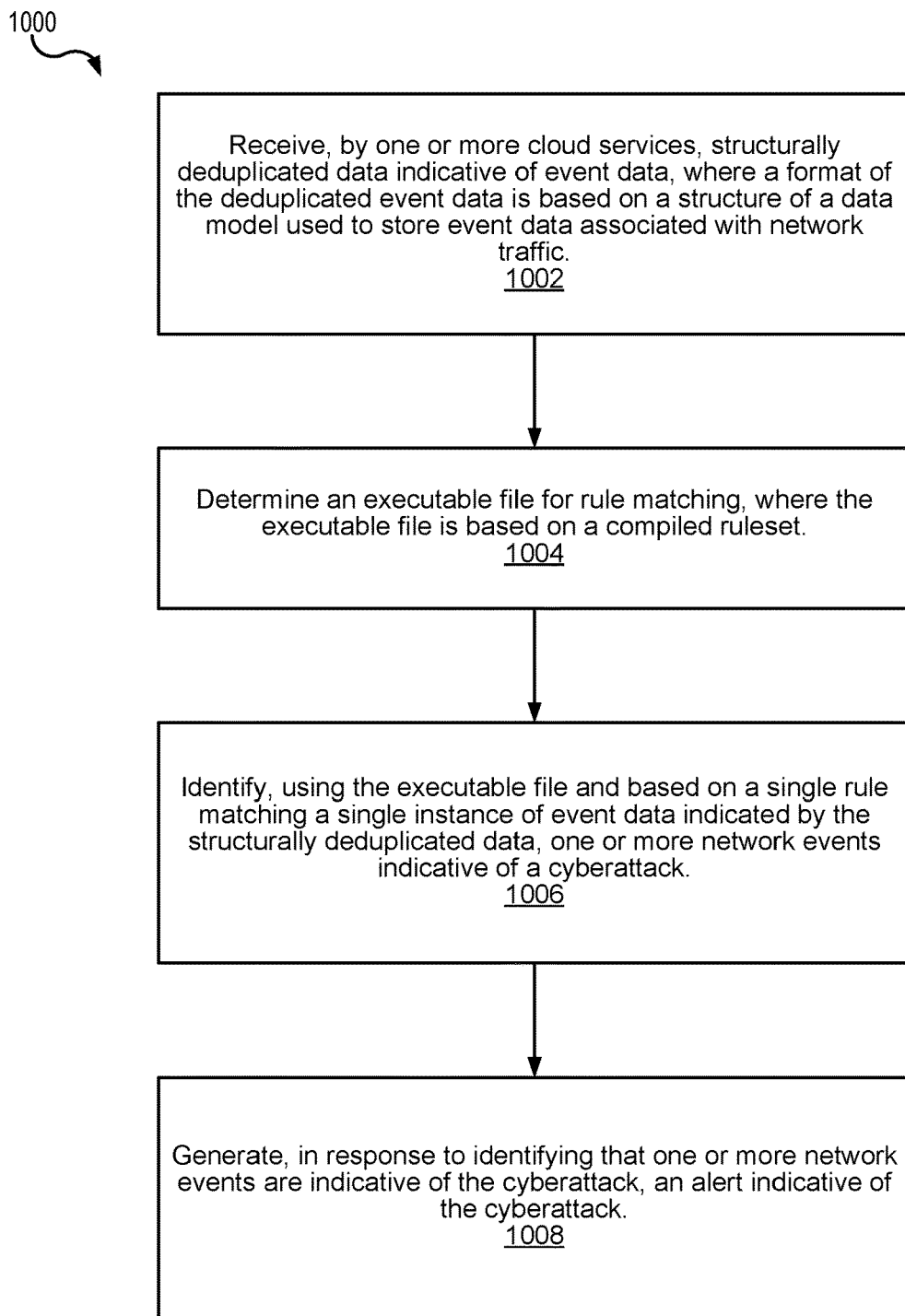
FIG. 10 is flowchart that illustrates an example of the security service platform, in accordance with some embodiments.

FIG. 10 is flowchart 1000 that illustrates an example of the security service platform 102, in accordance with some embodiments. In FIG. 10, one or more hardware processors may be used to implement the example process, where the hardware processors are described with respect to FIGS. 3 and 13.

FIG. 10 illustrates an example process that includes: receiving, at 1002, by one or more cloud services, structurally deduplicated data indicative of event data, wherein a format of the deduplicated event data is based on a structure of a data model used to store event data associated with network data; determining, at 1004, an executable file for rule matching, where the executable file is based on a compiled ruleset; identifying, at 1006, using the executable file and based on a single rule matching a single instance of event data indicated by the structurally deduplicated data, one or more network events indicative of a cyberattack; and generating, at 1008, in response to identifying that the one or more network events are indicative of the cyberattack, an alert indicative of the cyberattack.

Receiving, at 1002, by one or more cloud services, structurally deduplicated data indicative of event data, wherein a format of the deduplicated event data is based on a structure of a data model used to store event data associated with network data may be carried out as described with respect to FIGS. 1-8. For example, the security service 106 may receive structurally deduplicated data 156 that is indicative of event data 154, where the structurally deduplicated data 156 is based on data model 111 associated with the event data 154.

Determining, at 1004, an executable file for rule matching, where the executable file is based on a compiled ruleset may be carried out as described with respect to FIGS. 1-8. For example, the rule matching service 112 may compile rules 116 and/or blocklist 118 to generate an executable file.

Identifying, at 1006, using the executable file and based on a single rule matching a single instance of event data indicated by the structurally deduplicated data, one or more network events indicative of a cyberattack may be carried out as described with respect to FIGS. 1-8. For example, the security service 106, based on the rule matching service 112, rules 116 and/or blocklist 118, may determine that one or more network events indicated by the structurally deduplicated data 156 are indicative of a cyberattack based on a single rule matching.

Generating, at 1008, in response to identifying that the one or more network events are indicative of the cyberattack, an alert indicative of the cyberattack may be carried out as described with respect to FIGS. 1-4. For example, the rule matching service 112 may provide alert data 158 to an alert interface 114, where the alert interface 114 may handle the alert data 158 in various ways, including a user interface alert.

Figure 11:
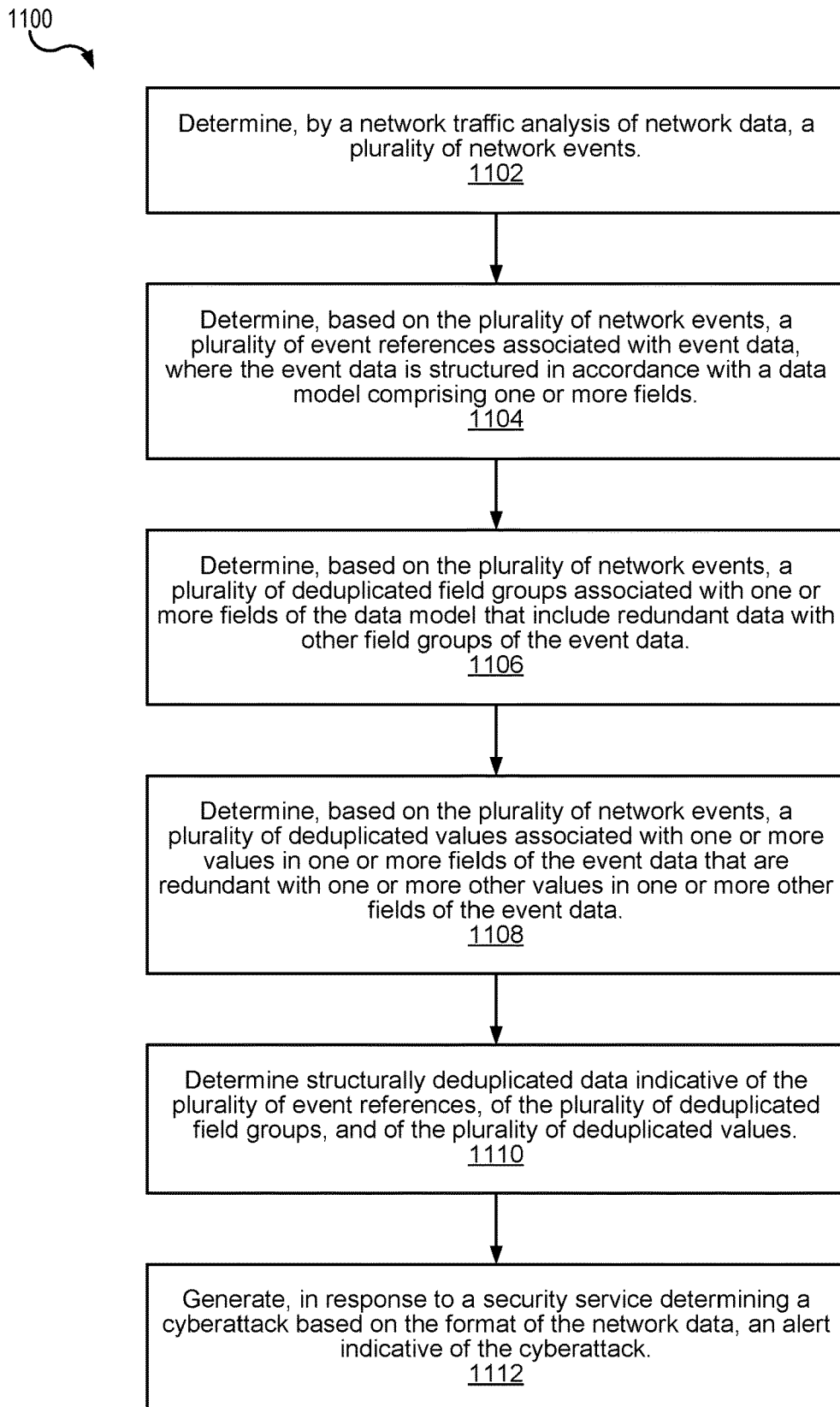
FIG. 11 is flowchart that illustrates an example of the security service platform 102, in accordance with some embodiments.

FIG. 11 is flowchart 1100 that illustrates an example of the security service platform 102, in accordance with some embodiments. In FIG. 11, one or more hardware processors may be used to implement the example process, where the hardware processors are described with respect to FIGS. 3 and 13.

FIG. 11 illustrates an example process that includes: determining, at 1102, by a network traffic analysis of network data, a plurality of network events; determining, at 1104, based on the plurality of network events, a plurality of event references associated with event data, wherein the event data is structured in accordance with a data model comprising one or more fields; determining, at 1106, based on the plurality of network events, a plurality of deduplicated field groups associated with one or more fields of the data model that include redundant data with other field groups of the event data; determining, at 1108, based on the plurality of network events, a plurality of deduplicated values associated with one or more values in one or more fields of the event data that are redundant with one or more other values in one or more other fields of the event data; determining, at 1110, structurally deduplicated data indicative of the plurality of event references, of the plurality of deduplicated field groups, and of the plurality of deduplicated values; and generating, at 1112, in response to a security service determining a cyberattack based on the format of the network data, an alert indicative of the cyberattack.

Determining, at 1102, by a network traffic analysis of network data, a plurality of network events may be carried out as described with respect to FIGS. 1-8. For example, the network sensor 104 may determine a plurality of network events 154 based on network data 152.

Determining, at 1104, based on the plurality of network events, a plurality of event references associated with event data, wherein the event data is structured in accordance with a data model comprising one or more fields may be carried out as described with respect to FIGS. 1-8. For example, the structural deduplication module 110 may determine structurally deduplicated data 156, including various types of structurally deduplicated data, such as event references, as described with respect to FIGS. 4-8.

Determining, at 1106, based on the plurality of network events, a plurality of deduplicated field groups associated with one or more fields of the data model that include redundant data with other field groups of the event data may be carried out as described with respect to FIGS. 1-8. For example, the structural deduplication module 110 may determine structurally deduplicated data 156, including various types of structurally deduplicated data, such as field groups, as described with respect to FIGS. 4-8.

Determining, at 1108, based on the plurality of network events, a plurality of deduplicated values associated with one or more values in one or more fields of the event data that are redundant with one or more other values in one or more other fields of the event data may be carried out as described with respect to FIGS. 1-4. For example, the structural deduplication module 110 may determine structurally deduplicated data 156, including various types of structurally deduplicated data, such as deduplicated values, as described with respect to FIGS. 4-8.

Determining, at 1110, structurally deduplicated data indicative of the plurality of event references, of the plurality of deduplicated field groups, and of the plurality of deduplicated values may be carried out as described with respect to FIGS. 1-4. For example, the structural deduplication module 110 may determine structurally deduplicated data 156, as described with respect to FIGS. 4-8.

Generating, at 1112, in response to a security service determining a cyberattack based on the format of the network data, an alert indicative of the cyberattack may be carried out as described with respect to FIGS. 1-4. For example, the rule matching service 112 may provide alert data 158 to an alert interface 114, where the alert interface 114 may handle the alert data 158 in various ways, including a user interface alert.

Figure 12:
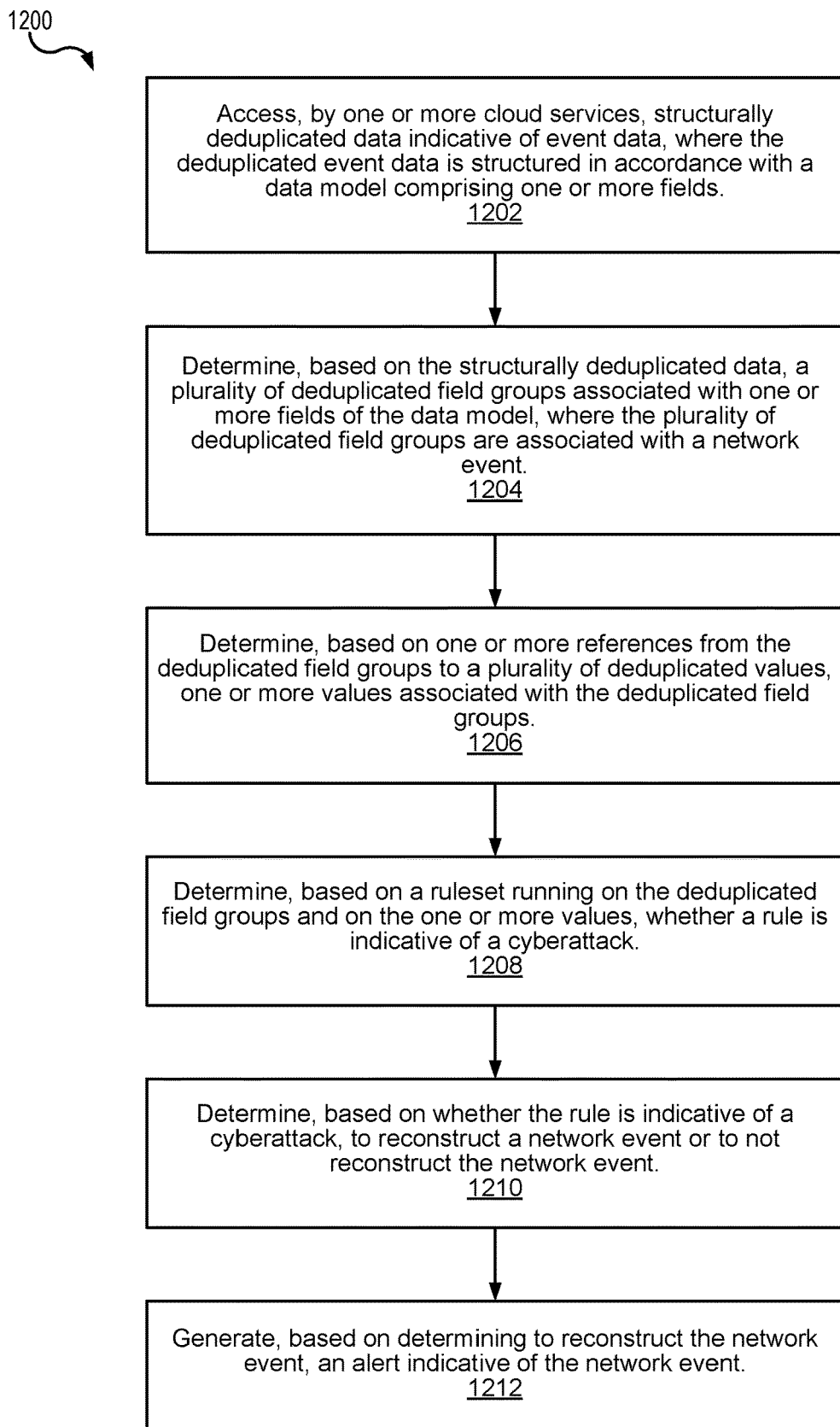
FIG. 12 is flowchart that illustrates an example of the security service platform, in accordance with some embodiments.

FIG. 12 is flowchart 1200 that illustrates an example of the security service platform 102, in accordance with some embodiments. In FIG. 12, one or more hardware processors may be used to implement the example process, where the hardware processors are described with respect to FIGS. 3 and 13.

FIG. 12 illustrates an example process that includes: accessing, at 1202, by one or more cloud services, structurally deduplicated data indicative of event data, wherein the deduplicated event data is structured in accordance with a data model comprising one or more fields; determining, at 1204, based on the structurally deduplicated data, a plurality of deduplicated field groups associated with one or more fields of the data model, wherein the plurality of deduplicated field groups are associated with a network event; determining, at 1206, based on one or more references from the deduplicated field groups to a plurality of deduplicated values, one or more values associated with the deduplicated field groups; determining, at 1208, based on a ruleset running on the deduplicated field groups and on the one or more values, whether a rule is indicative of a cyberattack; determining, at 1210, based on whether the rule is indicative of a cyberattack, to reconstruct a network event or to not reconstruct the network event; and generating, at 1212, based on determining to reconstruct the network event, an alert indicative of the network event.

Accessing, at 1202, by one or more cloud services, structurally deduplicated data indicative of event data, wherein the deduplicated event data is structured in accordance with a data model comprising one or more fields may be carried out as described with respect to FIGS. 1-8. For example, the security service 106 may receive structurally deduplicated data 156 that is indicative of event data 154.

Determining, at 1204, based on the structurally deduplicated data, a plurality of deduplicated field groups associated with one or more fields of the data model, wherein the plurality of deduplicated field groups are associated with a network event may be carried out as described with respect to FIGS. 1-8. For example, the security service 106 may access data represented by the structurally deduplicated data 156 based on the format of the structurally deduplicated data 156.

Determining, at 1206, based on one or more references from the deduplicated field groups to a plurality of deduplicated values, one or more values associated with the deduplicated field groups may be carried out as described with respect to FIGS. 1-8. For example, the security service 106 may access data represented by the structurally deduplicated data 156 based on the format of the structurally deduplicated data 156.

Determining, at 1208, based on a ruleset running on the deduplicated field groups and on the one or more values, whether a rule is indicative of a cyberattack may be carried out as described with respect to FIGS. 1-8. For example, the security service 106, based on the rule matching service 112, rules 116 and/or blocklist 118, may determine that one or more network events indicated by the structurally deduplicated data 156 are indicative of a cyberattack.

Determining, at 1210, based on whether the rule is indicative of a cyberattack, to reconstruct a network event or to not reconstruct the network event may be carried out as described with respect to FIGS. 1-8. For example, as described with respect to FIG. 1, if the security service 106 determines that a network event associated with the rule is not indicative of a cyberattack, the security service platform 102 does not reconstruct a network event, which results in performance improvement.

Generating, at 1212, based on determining to reconstruct the network event, an alert indicative of the network event may be carried out as described with respect to FIGS. 1-8. For example, the rule matching service 112 may provide alert data 158 to an alert interface 114, where the alert interface 114 may handle the alert data 158 in various ways, including a user interface alert.

Figure 13:
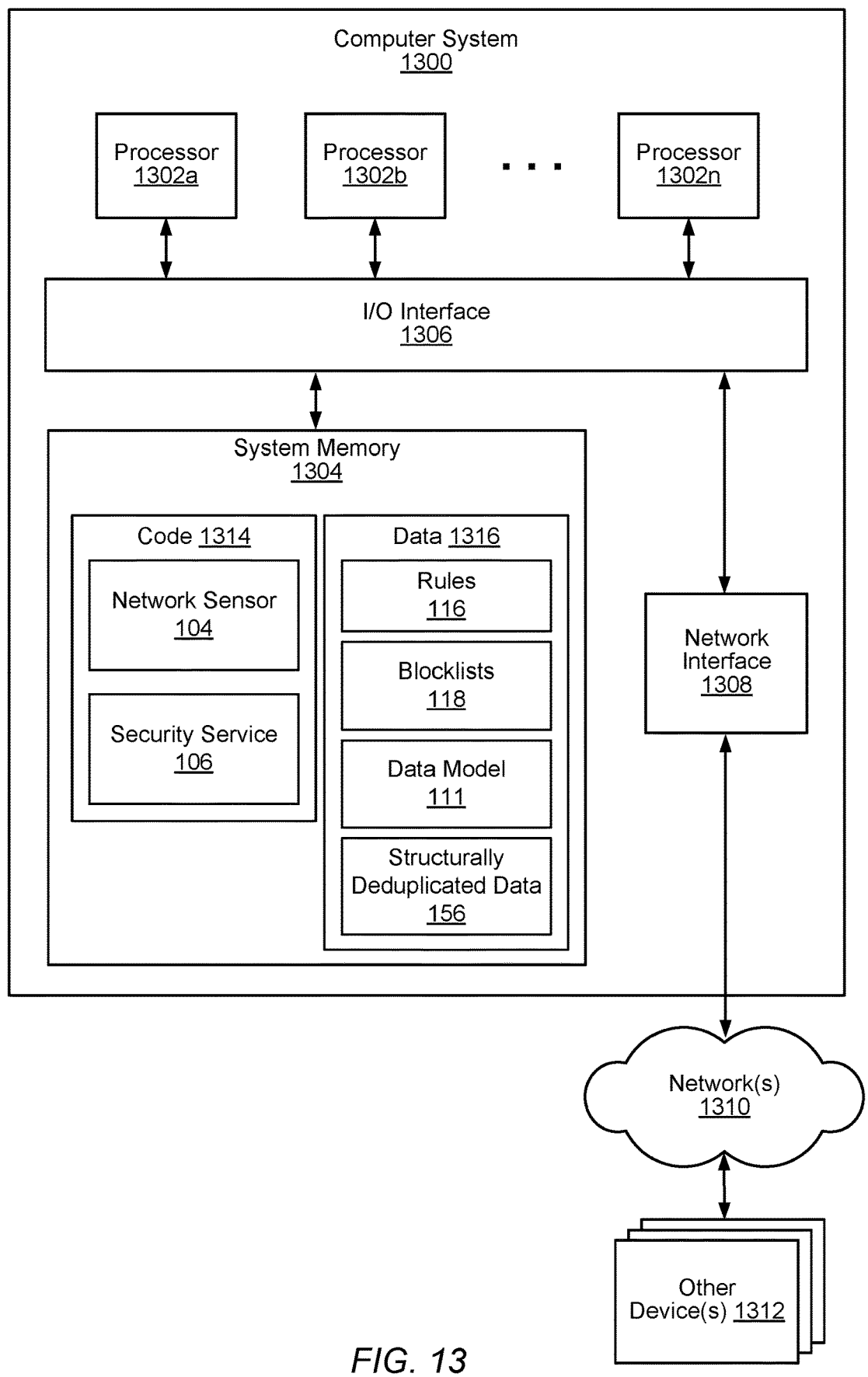
FIG. 13 is a block diagram illustrating an example computer system that implements a security service platform, according to some embodiments.

FIG. 13 is a block diagram illustrating an example computer system 1300 that may be used in a security environment that includes a network sensor host that implements an RSS configuration component, according to some embodiments. For example, the computer system 1300 may implement the security service platform 102 disclosed herein with reference to FIGS. 1-12.

Computer system 1300 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1300 includes one or more processors 1302, which may include multiple cores coupled to a system memory 1304 via an input/output (I/O) interface 1306. Computer system 1300 further includes a network interface 1308 coupled to I/O interface 1306. In some embodiments, computer system 1300 may be a uniprocessor system including one processor 1302, or a multiprocessor system including several processors 1302a-n, as shown. The processors 1302 may be any suitable processors capable of executing instructions. For example, in various embodiments, processors 1302 may implement one of a number of instruction set architectures (ISAs), such as the x86, PowerPC, SPARC, or MIPS ISA.

As shown, the computer system 1300 may also include one or more network communication devices (e.g., network interface 1308) for communicating with other systems and/or components over a communications network (e.g., network(s) 1310). For example, an instance of an application executing on computer system 1300 may use network interface 1308 to communicate with another server application executing on another computer system, as described herein.

As shown, computer system 1300 may use its network interface 1308 to communicate with one or more other devices 1312, such as persistent storage devices and/or one or more I/O devices. In some embodiments, some of these other devices may be implemented locally on the computer system 1300, accessible via the I/O interface 1306. In various embodiments, persistent storage devices may include disk drives, tape drives, solid state memory, other mass storage devices, or any other persistent storage device. The computer system 1300 may store instructions and/or data in persistent storage devices and retrieve the stored instruction and/or data as needed.

As shown, the computer system 1300 may include one or more system memories 1304 that store instructions and data accessible by processor(s) 1302. In various embodiments, system memories 1304 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1304 may be used to store code 1314 or executable instructions to implement the methods and techniques described herein. As a non-limiting example, the executable instructions may include instructions to implement an RSS configuration component 104, network interface driver(s) 112, and/or a network sensor 114, etc., as discussed herein with reference to FIG. 1. The system memory 1304 may also be used to store data 1316 needed or produced by the executable instructions. As a non-limiting example, the in-memory data 1316 may include data associated with an RSS configuration 120, network interface driver settings 118, network traffic data 120, and/or network sensor processed data, etc., as discussed herein with reference to FIG. 1.

In some embodiments, some of the code 1314 or executable instructions may be persistently stored on the computer system 1300 and may have been loaded from external storage media. The persistent storage of the computer system 1300 and the external media are examples of non-transitory computer-readable storage media, which may be used to store program instructions to be executed by the computer system 1300. A non-transitory computer-readable storage medium may provide the capability to store information in a form readable by a machine (e.g., computer system 1300). Non-transitory computer-readable media may include storage media such as magnetic or optical media, disk or DVD/CD-ROM devices, archival tapes, network-attached storage systems, or other computer systems.

In some embodiments, the I/O interface 1306 may be configured to coordinate I/O traffic between processor 1302, system memory 1304 and any peripheral devices in the system, including through network interface 1308 or other peripheral interfaces. In some embodiments, I/O interface 1306 may perform any necessary protocol, timing, or other data transformations to convert data signals from one component (e.g., system memory 1304) into a format suitable for use by another component (e.g., processor 1302). In some embodiments, I/O interface 1306 may include support for devices attached through various types of peripheral buses, such as a variant of the Peripheral Component Interconnect (PCI) bus standard or the Universal Serial Bus (USB) standard, for example. In some embodiments, the function of I/O interface 1306 may be split into two or more separate components, such as a north bridge and a south bridge, for example. Also, in some embodiments, some or all of the functionality of I/O interface 1306, such as an interface to system memory 1304, may be incorporated directly into processor 1302.

In some embodiments, the network interface 1308 may allow data to be exchanged between computer system 1300 and other devices attached to a network. The network interface 1308 may also allow communication between computer system 1300 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1308. Network interface 1308 may commonly support one or more wireless networking protocols (e.g., Wi-Fi/IEEE 802.11, or another wireless networking standard). In some embodiments, the network interface 1308 may support communication via telecommunications/telephony networks such as analog voice networks or digital fiber communications networks, via storage area networks such as Fibre Channel SANs, or via any other suitable type of network and/or protocol.

In some implementations, advantages and features of the present disclosure may be further described by the following 20 statements.

1. A method comprising: accessing, by one or more cloud services, structurally deduplicated data indicative of event data, wherein the deduplicated event data is structured in accordance with a data model comprising one or more fields; determining, based on the structurally deduplicated data, a plurality of deduplicated field groups associated with one or more fields of the data model, wherein the plurality of deduplicated field groups are associated with a network event; determining, based on one or more references from the deduplicated field groups to a plurality of deduplicated values, one or more values associated with the deduplicated field groups; determining, based on a ruleset running on the deduplicated field groups and on the one or more values, whether a rule is indicative of a cyberattack; and determining, based on whether the rule is indicative of a cyberattack, to reconstruct a network event or to not reconstruct the network event; and generating, based on determining to reconstruct the network event, an alert indicative of the network event.

2. The method of claim 1, wherein the structurally deduplicated data is indicative of multiple data formats, wherein the multiple data formats are associated with a combination of: TLS events, DNS events, or flow events.

3. The method of claim 1, wherein the structurally deduplicated data comprises: a plurality of event references associated with event data, wherein the event data is structured in accordance with a data model comprising one or more fields; a plurality of deduplicated field groups associated with one or more fields of the data model that include redundant data with other field group of the event data; and a plurality of deduplicated values associated with one or more values in one or more fields of the event data that are redundant with one or more other values in one or more other fields of the event data.

4. The method of claim 1, wherein more than one cyberattack attempt is determined based on a single rule matching a single instance of structurally deduplicated data.

5. The method of claim 1, further comprising: in response to the determining to reconstruct the network event: reconstructing, based on the structurally deduplicated data comprising deduplicated event data, an instance of a network event associated with the cyberattack; and determining, based on the instance of the network event, the one or more remediation operations; wherein the alert is indicative of the one or more remediation operations.

6. The method of claim 1, wherein event data included within the structurally deduplicated data comprises: a transport layer security (TLS) event; a domain name system (DNS) event; or a flow event.

7. The method of claim 1, wherein a quantity of levels of the deduplicated field groups is based on a quantity of nesting levels of a data model representing a network event.

8. A system comprising: a memory storing executable instructions; and one or more processors that execute the executable instructions to: access, by one or more cloud services, structurally deduplicated data indicative of event data, wherein the deduplicated event data is structured in accordance with a data model comprising one or more fields; determine, based on the structurally deduplicated data, a plurality of deduplicated field groups associated with one or more fields of the data model, wherein the plurality of deduplicated field groups are associated with a network event; determine, based on one or more references from the deduplicated field groups to a plurality of deduplicated values, one or more values associated with the deduplicated field groups; determine, based on a ruleset running on the deduplicated field groups and on the one or more values, whether a rule is indicative of a cyberattack; and determine, based on whether the rule is indicative of a cyberattack, to reconstruct a network event or to not reconstruct the network event; and generate, based on determining to reconstruct the network event, an alert indicative of the network event.

9. The system of claim 8, wherein a format of the structurally deduplicated data is based on a structure of the data model.

10. The system of claim 9, wherein a format of the structurally deduplicated data is based on: determining one or more references from one or more of the plurality of event references to one or more of the deduplicated field groups; and determining one or more second references from one or more of the deduplicated field groups to one or more of the plurality of deduplicated values.

11. The system of claim 10, wherein the structurally deduplicated data is indicative of multiple data formats, wherein the multiple data formats are associated with a combination of: TLS events, DNS events, or flow events.

12. The system of claim 8, wherein the structurally deduplicated data comprises: a plurality of event references associated with event data, wherein the event data is structured in accordance with a data model comprising one or more fields; a plurality of deduplicated field groups associated with one or more fields of the data model that include redundant data with other field group of the event data; and a plurality of deduplicated values associated with one or more values in one or more fields of the event data that are redundant with one or more other values in one or more other fields of the event data.

13. The system of claim 8, wherein event data included within the structurally deduplicated data comprises: a transport layer security (TLS) event; a domain name system (DNS) event; or a flow event.

14. The system of claim 8, wherein a quantity of levels of the deduplicated field groups is based on a quantity of nesting levels of a data model representing a network event.

15. One or more non-transitory computer-accessible storage media storing executable instructions that, when executed by one or more processors, cause one or more computer systems to: access, by one or more cloud services, structurally deduplicated data indicative of event data, wherein the deduplicated event data is structured in accordance with a data model comprising one or more fields; determine, based on the structurally deduplicated data, a plurality of deduplicated field groups associated with one or more fields of the data model, wherein the plurality of deduplicated field groups are associated with a network event; determine, based on one or more references from the deduplicated field groups to a plurality of deduplicated values, one or more values associated with the deduplicated field groups; determine, based on a ruleset running on the deduplicated field groups and on the one or more values, whether a rule is indicative of a cyberattack; and determine, based on whether the rule is indicative of a cyberattack, to reconstruct a network event or to not reconstruct the network event; and generate, based on determining to reconstruct the network event, an alert indicative of the network event.

16. The one or more non-transitory computer-accessible storage media of claim 15, wherein the structurally deduplicated data is indicative of multiple data formats, wherein the multiple data formats are associated with a combination of: TLS events, DNS events, or flow events.

17. The one or more non-transitory computer-accessible storage media of claim 16, wherein the structurally deduplicated data comprises: a plurality of event references associated with event data, wherein the event data is structured in accordance with a data model comprising one or more fields; a plurality of deduplicated field groups associated with one or more fields of the data model that include redundant data with other field group of the event data; and a plurality of deduplicated values associated with one or more values in one or more fields of the event data that are redundant with one or more other values in one or more other fields of the event data.

18. The one or more non-transitory computer-accessible storage media of claim 15, wherein the one or more processors, further cause one or more computer systems to: in response to the determining to reconstruct the network event: reconstruct, based on the structurally deduplicated data comprising deduplicated event data, an instance of a network event associated with the cyberattack; and determine, based on the instance of the network event, the one or more remediation operations; wherein the alert is indicative of the one or more remediation operations.

19. The one or more non-transitory computer-accessible storage media of claim 15, wherein event data included within the structurally deduplicated data comprises: a transport layer security (TLS) event; a domain name system (DNS) event; or a flow event.

20. The one or more non-transitory computer-accessible storage media of claim 15, wherein a quantity of levels of the deduplicated field groups is based on a quantity of nesting levels of a data model representing a network event.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:
    accessing, by one or more cloud services, structurally deduplicated data indicative of event data, wherein the deduplicated event data is structured in accordance with a data model comprising one or more fields;
    determining, based on the structurally deduplicated data, a plurality of deduplicated field groups associated with one or more fields of the data model, wherein the plurality of deduplicated field groups are associated with a network event;
    determining, based on one or more references from the deduplicated field groups to a plurality of deduplicated values, one or more values associated with the deduplicated field groups;
    determining, based on a ruleset running on the deduplicated field groups and on the one or more values, whether a rule is indicative of a cyberattack;
    determining, based on whether the rule is indicative of a cyberattack, to reconstruct a network event or to not reconstruct the network event; and
    generating, based on determining to reconstruct the network event, an alert indicative of the network event.

2. The method of claim 1, wherein the structurally deduplicated data is indicative of multiple data formats, wherein the multiple data formats are associated with a combination of: TLS events, DNS events, or flow events.

3. The method of claim 1, wherein the structurally deduplicated data comprises:
    a plurality of event references associated with event data, wherein the event data is structured in accordance with a data model comprising one or more fields;
    a plurality of deduplicated field groups associated with one or more fields of the data model that include redundant data with other field group of the event data; and
    a plurality of deduplicated values associated with one or more values in one or more fields of the event data that are redundant with one or more other values in one or more other fields of the event data.

4. The method of claim 1, wherein more than one cyberattack attempt is determined based on a single rule matching a single instance of structurally deduplicated data.

5. The method of claim 1, further comprising:
    in response to the determining to reconstruct the network event:
        reconstructing, based on the structurally deduplicated data comprising deduplicated event data, an instance of a network event associated with the cyberattack; and
        determining, based on the instance of the network event, the one or more remediation operations;
    wherein the alert is indicative of the one or more remediation operations.

6. The method of claim 1, wherein event data included within the structurally deduplicated data comprises: a transport layer security (TLS) event; a domain name system (DNS) event; or a flow event.

7. The method of claim 1, wherein a quantity of levels of the deduplicated field groups is based on a quantity of nesting levels of a data model representing a network event.

8. A system comprising:
    a memory storing executable instructions; and
    one or more processors that execute the executable instructions to:
        access, by one or more cloud services, structurally deduplicated data indicative of event data, wherein the deduplicated event data is structured in accordance with a data model comprising one or more fields;
        determine, based on the structurally deduplicated data, a plurality of deduplicated field groups associated with one or more fields of the data model, wherein the plurality of deduplicated field groups are associated with a network event;
        determine, based on one or more references from the deduplicated field groups to a plurality of deduplicated values, one or more values associated with the deduplicated field groups;
        determine, based on a ruleset running on the deduplicated field groups and on the one or more values, whether a rule is indicative of a cyberattack;
        determine, based on whether the rule is indicative of a cyberattack, to reconstruct a network event or to not reconstruct the network event; and
        generate, based on determining to reconstruct the network event, an alert indicative of the network event.

9. The system of claim 8, wherein a format of the structurally deduplicated data is based on a structure of the data model.

10. The system of claim 9, wherein a format of the structurally deduplicated data is based on:
    determining one or more references from one or more of the plurality of event references to one or more of the deduplicated field groups; and
    determining one or more second references from one or more of the deduplicated field groups to one or more of the plurality of deduplicated values.

11. The system of claim 10, wherein the structurally deduplicated data is indicative of multiple data formats, wherein the multiple data formats are associated with a combination of: TLS events, DNS events, or flow events.

12. The system of claim 8, wherein the structurally deduplicated data comprises:
    a plurality of event references associated with event data, wherein the event data is structured in accordance with a data model comprising one or more fields;
    a plurality of deduplicated field groups associated with one or more fields of the data model that include redundant data with other field group of the event data; and
    a plurality of deduplicated values associated with one or more values in one or more fields of the event data that are redundant with one or more other values in one or more other fields of the event data.

13. The system of claim 8, wherein event data included within the structurally deduplicated data comprises: a transport layer security (TLS) event; a domain name system (DNS) event; or a flow event.

14. The system of claim 8, wherein a quantity of levels of the deduplicated field groups is based on a quantity of nesting levels of a data model representing a network event.

15. One or more non-transitory computer-accessible storage media storing executable instructions that, when executed by one or more processors, cause one or more computer systems to:
    access, by one or more cloud services, structurally deduplicated data indicative of event data, wherein the deduplicated event data is structured in accordance with a data model comprising one or more fields;
    determine, based on the structurally deduplicated data, a plurality of deduplicated field groups associated with one or more fields of the data model, wherein the plurality of deduplicated field groups are associated with a network event;

determine, based on one or more references from the deduplicated field groups to a plurality of deduplicated values, one or more values associated with the deduplicated field groups;

determine, based on a ruleset running on the deduplicated field groups and on the one or more values, whether a rule is indicative of a cyberattack;

determine, based on whether the rule is indicative of a cyberattack, to reconstruct a network event or to not reconstruct the network event; and generate, based on determining to reconstruct the network event, an alert indicative of the network event.

16. The one or more non-transitory computer-accessible storage media of claim 15, wherein the structurally deduplicated data is indicative of multiple data formats, wherein the multiple data formats are associated with a combination of: TLS events, DNS events, or flow events.

17. The one or more non-transitory computer-accessible storage media of claim 16, wherein the structurally deduplicated data comprises:

a plurality of event references associated with event data, wherein the event data is structured in accordance with a data model comprising one or more fields;

a plurality of deduplicated field groups associated with one or more fields of the data model that include redundant data with other field group of the event data; and a plurality of deduplicated values associated with one or more values in one or more fields of the event data that are redundant with one or more other values in one or more other fields of the event data.

18. The one or more non-transitory computer-accessible storage media of claim 15, wherein the one or more processors, further cause one or more computer systems to:

in response to the determining to reconstruct the network event:

reconstruct, based on the structurally deduplicated data comprising deduplicated event data, an instance of a network event associated with the cyberattack; and determine, based on the instance of the network event, the one or more remediation operations;

wherein the alert is indicative of the one or more remediation operations.

19. The one or more non-transitory computer-accessible storage media of claim 15, wherein event data included within the structurally deduplicated data comprises: a transport layer security (TLS) event; a domain name system (DNS) event; or a flow event.

20. The one or more non-transitory computer-accessible storage media of claim 15, wherein a quantity of levels of the deduplicated field groups is based on a quantity of nesting levels of a data model representing a network event.

* * * * *